United States Patent
Welu

(10) Patent No.: US 11,080,415 B2
(45) Date of Patent: Aug. 3, 2021

(54) DOCUMENT PROPORTIONAL ALLOCATION SYSTEM

(71) Applicant: Total Expert LLC, St. Louis Park, MN (US)

(72) Inventor: Joseph Welu, Eden Prairie, MN (US)

(73) Assignee: Total Expert LLC, St. Louis Park, MN (US)

( * ) Notice: Subject to any disclaimer, the term of this patent is extended or adjusted under 35 U.S.C. 154(b) by 0 days.

(21) Appl. No.: 16/566,184

(22) Filed: Sep. 10, 2019

(65) Prior Publication Data

US 2020/0074095 A1 Mar. 5, 2020

Related U.S. Application Data

(63) Continuation of application No. 15/654,229, filed on Jul. 19, 2017, now Pat. No. 10,445,515.

(51) Int. Cl.
| | |
|---|---|
| *G06Q 30/06* | (2012.01) |
| *G06F 21/62* | (2013.01) |
| *G06Q 50/16* | (2012.01) |
| *G06F 3/048* | (2013.01) |
| *G06F 3/0481* | (2013.01) |
| *G06F 3/0484* | (2013.01) |
| *G06F 40/166* | (2020.01) |

(52) U.S. Cl.
CPC .......... *G06F 21/6209* (2013.01); *G06F 3/048* (2013.01); *G06F 3/0481* (2013.01); *G06F 3/04845* (2013.01); *G06F 21/6218* (2013.01); *G06Q 30/0607* (2013.01); *G06Q 50/16* (2013.01); *G06F 40/166* (2020.01)

(58) Field of Classification Search
CPC . G06F 16/20; G06F 16/30; G06F 3/04; G06F 16/903; G06F 16/9035; G06F 16/9038; G06F 16/838; G06F 16/86; G06F 16/80; G06F 16/90; G06F 40/00; G06Q 50/16; G06Q 30/0607; G06Q 30/06
See application file for complete search history.

(56) References Cited

U.S. PATENT DOCUMENTS

| | | | |
|---|---|---|---|
| 10,127,444 B1* | 11/2018 | Burch | ................ G06K 9/00463 |
| 2006/0155570 A1 | 7/2006 | Almeida et al. | |
| 2007/0056045 A1* | 3/2007 | Collins | ............... G06F 21/6209 726/27 |
| 2007/0179960 A1* | 8/2007 | Young | ..................... G06F 9/451 |
| 2009/0112678 A1 | 4/2009 | Luzardo | |
| 2012/0059822 A1 | 3/2012 | Malandain et al. | |
| 2012/0084642 A1* | 4/2012 | Grams | ................. G06F 40/183 715/243 |

(Continued)

*Primary Examiner* — Sanchita Roy
(74) *Attorney, Agent, or Firm* — Schwegman Lundberg & Woessner, P.A.

(57) ABSTRACT

Systems and methods may be used to create and modify a co-marketed document. A system and method may include using a template with designated editable regions for each co-marketer, wherein each co-marketer may not edit regions designated for the other co-marketer. The system and method may include selecting regions of the co-marketed document for each co-marketer to determine the percentage of space each co-marketer utilizes on a co-marketed document. The system and method may include providing mechanisms for the determined percentage of space to be verified, approved, and transmitted to a printing service.

17 Claims, 20 Drawing Sheets

(56) References Cited

U.S. PATENT DOCUMENTS

| | | | |
|---|---|---|---|
| 2013/0185252 A1* | 7/2013 | Palmucci | G06F 40/197 |
| | | | 707/608 |
| 2014/0082530 A1 | 3/2014 | De Oliveira et al. | |
| 2015/0066868 A1* | 3/2015 | Tanba | G06F 16/35 |
| | | | 707/687 |
| 2016/0209994 A1* | 7/2016 | Kaufthal | G06F 8/38 |
| 2017/0346828 A1 | 11/2017 | Lorensson et al. | |
| 2018/0081535 A1* | 3/2018 | Murakawa | G06F 40/106 |
| 2019/0026481 A1 | 1/2019 | Welu | |

* cited by examiner

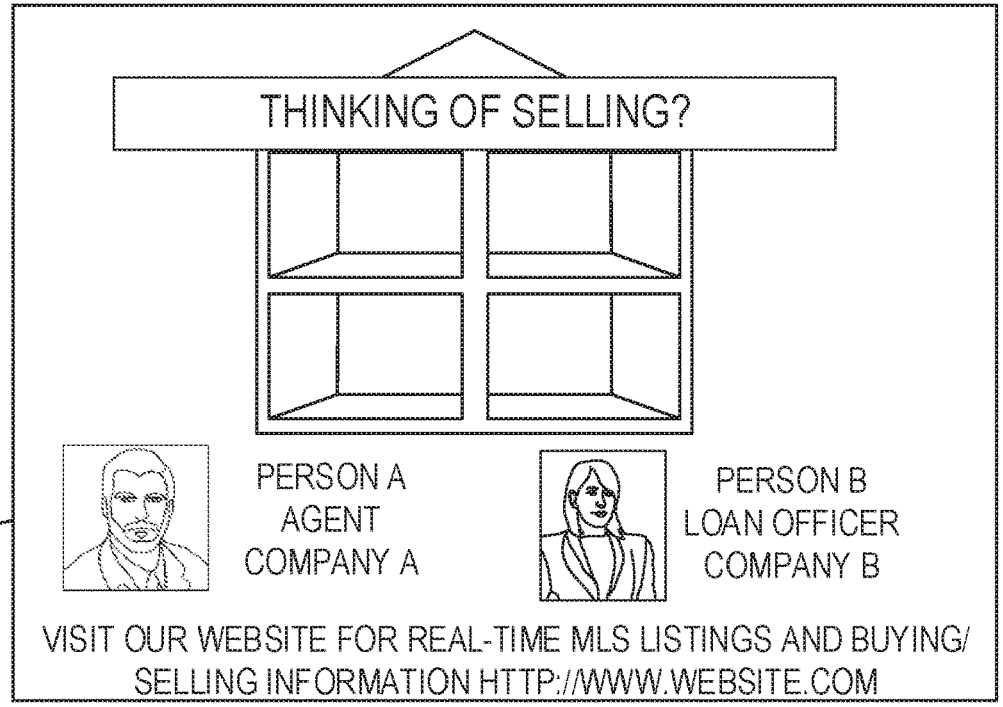
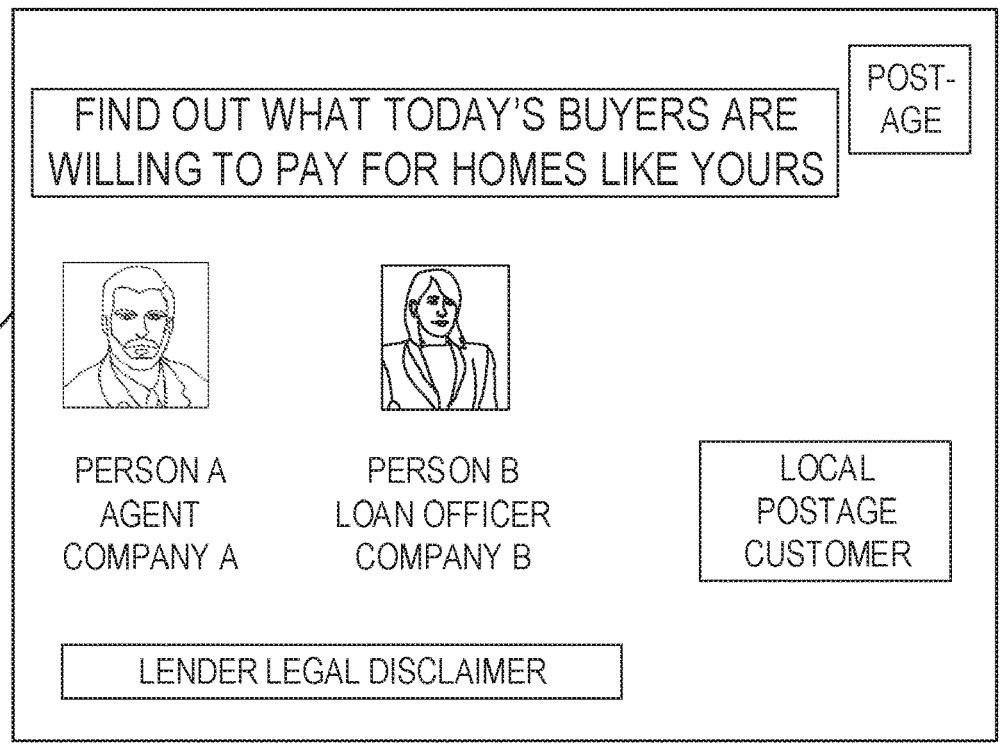
FIG. 1

1402
1404

JOB SUMMARY
ITEM DESCRIPTION:    PCFT0609MDIY004
PRINT DETAIL:        80 QTY, USPS FIRST CLASS MAIL
ORDER ID:       57

GENERATED BY:   JOHN AGENT
COMPANY:        ACME, INC.

DATE GENERATED:      SEPTEMBER 2, 2015

DISTRIBUTION AREA:   USER PROVIDED FILE
DISTRIBUTION PERIOD: SEPTEMBER 2015

CO-MARKETERS:

JOHN AGENT          JOE LENDER
REALTOR             LOAN OFFICER, 849763
ACME, INC.          STONEGATE MORTGAGE
MEGAPOLIS, AK       METRO, GA

CO-MARKETER PRO RATA SHARES AND PAYMENTS:
TOTAL CHARGES: $144.46
SPACE ALLOCATIONS COMPLETED: APRIL 8, 2015

| CO-MARKETER 1 AGENT, 47% | CO-MARKETER 2 LENDER, 53% |
|---|---|
| APPROVAL DATE: 9/2/2015 | APPROVAL DATE: 8/26/2015 |
| AMOUNT DUE: $67.90 | AMOUNT DUE: $76.56 |
| AMOUNT PAID: $67.90 | AMOUNT PAID: $34.45 |
| PAYMENT DATE: 9/2/2015 | PAYMENT DATE: 9/2/2015 |
| PAYMENT TYPE: CREDIT CARD | PAYMENT TYPE: CREDIT CARD |

| PAYMENT RECEIPTS | |
| --- | --- |
| AGENT PAYMENT RECEIPT | |
| DESCRIPTION | AMOUNT |
| AGENT PAYMENT FOR PRINT ORDER #57 | $67.90 |
| SALES TAX | $0.00 |
| TOTAL DUE | $67.90 |
| TOTAL PAID | $67.90 |
| BALANCE DUE | $0.00 |
| PAYMENT OF $67.90 WAS CHARGED TO AMERICAN EXPRESS CARD | |
| LOAN OFFICER PAYMENT RECEIPT | |
| DESCRIPTION | AMOUNT |
| LOAN OFFICER PAYMENT FOR PRINT ORDER #57 | $34.45 |
| SALES TAX | $0.00 |
| TOTAL DUE | $34.45 |
| TOTAL PAID | $34.45 |
| BALANCE DUE | $0.00 |
| PAYMENT OF $34.45 WAS CHARGED TO VISA CARD | |
| LENDING COMPANY PAYMENT RECEIPT | |
| DESCRIPTION | AMOUNT |
| LENDING COMPANY PAYMENT FOR PRINT ORDER #57 | $42.11 |
| SALES TAX | $0.00 |
| TOTAL DUE | $42.11 |
| TOTAL PAID | $42.11 |
| BALANCE DUE | $0.00 |
| PAYMENT OF $42.11 WAS CHARGED TO MASTERCARD | |

*FIG. 15*

DOCUMENT PROPORTIONAL ALLOCATION SYSTEM

CLAIM OF PRIORITY

This application is a continuation of U.S. patent application Ser. No. 15/654,229, filed on Jul. 19, 2017, which is incorporated herein by reference in its entirety.

TECHNICAL FIELD

The present disclosure relates generally to desktop publishing and specifically to controlled editing of a document and calculating document markup proportions.

BACKGROUND

Under the Real Estate Settlement Procedures Act of 1974 ("RESPA") and its implementing Regulation X (collectively, "RESPA Section 8,") a person is prohibited from giving or accepting "any fee, kickback, or thing of value pursuant to any agreement or understanding, oral or otherwise, that business incident to or a part of a real estate settlement service involving a federally related mortgage loan shall be referred to any person." (12 U.S.C. § 2607(a)).

RESPA does not prohibit referrals in real estate settlement services, but when a referral is made in connection with any form of compensation or thing of value, the exchange implicates RESPA Section 8. In addition, RESPA Section 8 permits "normal promotional activities that are not conditioned on the referral of business and do not involve the defraying of expenses that otherwise would be incurred by persons in a position to refer settlement services or business." (12 C.F.R. § 1024.14(g)(vi)).

Real estate agents, mortgage loan officers, escrow agents, etc., tend to work together regularly and often refer clients to one another; thus, it may become difficult for companies to defend the position that such clients were not referred in exchange for a "thing of value" in cases where one party has defrayed expenses for another. A common example occurs when a mortgage loan officer and real estate agent market their services together, but the loan officer pays more than the loan officer's fair share of costs or otherwise covers costs that would normally be incurred by the agent. Regardless of the intent of the loan officer, a RESPA regulator could view this as a disguised attempt to pay for referrals and a potential RESPA Section 8 violation could result.

These issues are compounded by the fact that the Consumer Financial Protection Bureau ("CFPB"), which has authority over RESPA, has taken an aggressive position on marketing under RESPA in the context of marketing services agreements ("MSAs") and appears to be scrutinizing all types of business arrangements that may appear to involve referrals or otherwise implicate RESPA Section 8. As a result, mortgage companies, real estate companies, title companies (and others that are incident to or part of real estate settlement services regarding federally related mortgage loans) have become increasingly focused on ensuring that their co-marketing activities do not expose them to potential RESPA Section 8 violations.

Although all parties involved are subject to the regulations and the risks involved with engaging in activities that fall under the scrutiny of the CFBP, mortgage companies tend to be the most scrutinized in this regard and, therefore, tend to be very focused on ensuring compliance. Risk and Compliance policies and acceptable practices vary from mortgage company-to-mortgage company, with regard to how much documentation and proof of compliance is required from employees involved in co-marketing activities, but all may benefit from a sound methodology and a repeatable process for ensuring compliance with RESPA Section 8 and mitigating the risk of such violations. The need for such policies and practices becomes even more apparent in the event a mortgage company faces an audit or investigation by the CFPB.

Prior attempts by co-marketers, such as real estate agents and mortgage lenders, to divide expenses appropriately have been done with rough estimates and "eyeballing" the allocated space on joint co-marketed documents. This lacks the precision needed for compliance and is potentially illegal.

BRIEF DESCRIPTION OF THE DRAWINGS

Some embodiments are illustrated by way of example and not limitation in the figures of the accompanying drawings.

FIG. 1 is an example of a co-marketed real estate advertisement, according to an embodiment.

FIG. 14 illustrates an example of a print job summary for a particular print job of a co-marketed document, according to an embodiment.

FIG. 15 illustrates an example of a job payment receipt for a particular print job of a co-marketed document, according to an embodiment.

DETAILED DESCRIPTION

Figure 2:
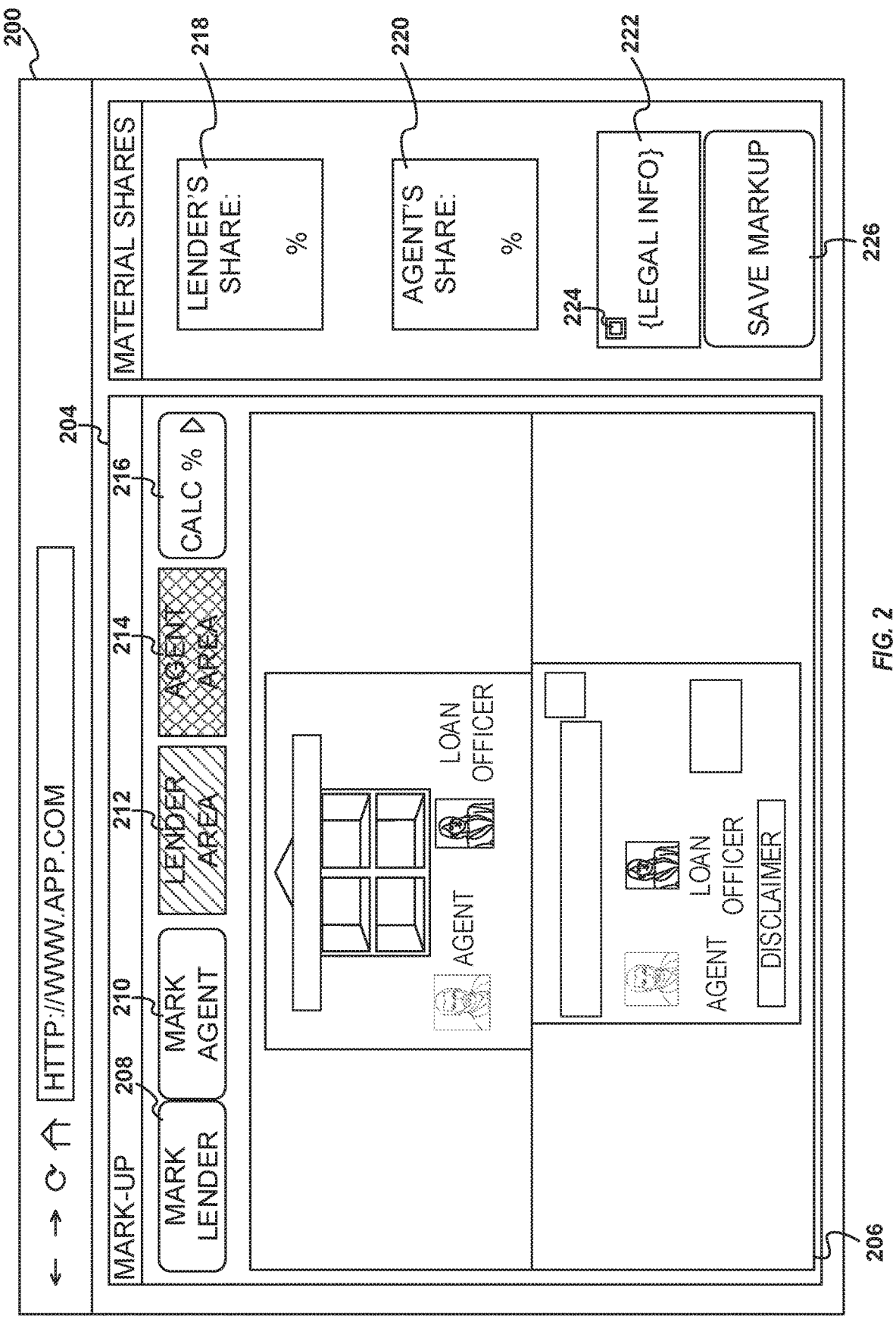
FIG. 2 illustrates an example user interface including a markup editor for selecting regions of a document corresponding to a plurality of co-marketers, according to an embodiment.

The present disclosure describes methods, systems, and computer program products that individually provide employees of mortgage companies/lenders, real estate companies, title companies, builders, and other related companies, with a solution for generating RESPA Section 8 compliant co-marketing materials, creating operational efficiencies, and reducing RESPA Section 8 compliance risks.

Two examples of common co-marketing practices that put mortgage companies (and other companies involved in such practices) at risk for RESPA Section 8 violations and/or enforcement actions are as follows:

1) A mortgage company enters into an agreement with another company, such as a real estate brokerage, under which the brokerage agrees to perform certain marketing services for the mortgage company, such as including the lender's branding and messages on a portion of the brokerage's direct mail campaigns, on property flyers, websites, email, etc., on a monthly basis for a flat fee. This type of arrangement is known as a "marketing services agreement" or "MSA".

In an MSA, the mortgage company ensures that the amount the mortgage company pays to the real estate broker for the monthly marketing services the real estate broker performs is commensurate with the fair market value for similar services and that the services are actually performed by the real estate broker. If the mortgage company overpays for the services performed, or pays for services that are not performed at all, both parties are at risk of potential RESPA Section 8 violations and enforcement actions.

Methods exist for determining fair market value for services, but many mortgage companies still struggle with obtaining documentation and proof from all of their MSA providers that the marketing services were actually performed. Many mortgage companies use a "checklist" or a "certification" in place of actual proof or documentation of marketing services performed; however, due to the CFPB's scrutiny over these types of arrangements, risk and compliance departments of mortgage companies are starting to require more concrete evidence than checklists or certifications.

2) A lender/loan officer and a real estate broker/realtor agree to co-market their services together on a co-marketed advertisement, such as a direct mail postcard. In this case, the lender/loan officer and the real estate broker/realtor are each required to pay for their fair share of the co-marketed advertisement and neither may defray expenses for the other. Generally, to comply with RESPA Section 8, the percentage of the total costs paid by each party for the co-marketed advertisement is equal to the amount of branding/messaging space each party occupies on the co-marketed advertisement.

For example, if the broker/realtor's branding/messaging appears on 95% of the postcard and the lender/loan officer's branding/messaging appears on 5% of the postcard, the broker/realtor pays 95% of the cost of the postcard and the lender/loan officer pays 5% of the cost of the postcard. There is a common misconception among loan officers and real estate agents that, as long as the parties split the cost equally, there is no risk of violation; in reality, the parties each pay their pro rata share of the total expenses (whether 50%/50%, 65%/35%, 95%/5%, etc.) If one party pays more than that party's pro rata share, a RESPA regulator may later view this as a disguised attempt to pay for referrals from the other party, and a potential RESPA Section 8 violation could result.

Most mortgage companies have some general policies or rules regarding the management of co-marketing and RESPA Section 8 compliance, but the responsibility to approve, record, and document compliance may fall on any combination of the loan officer, the marketing department, the compliance department, the risk department, or any other individual within the mortgage company. Compliance documentation, such as final costs, receipts showing the percentage of final costs paid by each party, and justification for the percentage of final costs paid by each party, may be difficult to track down for recordkeeping and/or audit purposes. In some cases, one party pays for the full amount of the advertising cost up front, which then requires the other party/parties to track down what the final costs were so that they may determine their pro rata share(s) and reimburse the first party for the appropriate amount. Regardless of who within the mortgage company is charged with keeping records and providing documentation, the mortgage company would ultimately be held accountable to RESPA regulators for RESPA Section 8 non-compliance.

Complicating matters further, many mortgage companies and real estate brokerages require that their commissioned sales staff (or other staff) cover all, or a percentage, of any marketing costs incurred by the company on their behalf. In cases where a mortgage company requires a loan officer to contribute to marketing expenses incurred by the loan officer, the mortgage company typically gives a loan officer an allowance of dollars toward marketing each month, or requires a contribution percentage that is paid by the loan officer for each marketing cost incurred. In the latter case, the contribution is generally made through either (1) a combination of a direct payment by the loan officer and a direct payment by the mortgage company, (2) a direct payment for the full amount by the loan officer and a percentage of reimbursement by the mortgage company, or (3) through a direct payment in full by the mortgage company with some sort of deduction being made through the mortgage company's accounting department (either via a reduction of the loan officer's total commission amount or another internal method). In most cases, the contribution requirement would exist whether the loan officer markets his/her services alone or co-markets with another entity.

In addition to RESPA Section 8 compliance requirements, both state and federal regulations require mortgage companies to keep records of all forms of marketing advertisements, including any co-marketing advertisements. This typically is not a problem for advertisements created in-house because the process is generally more controlled, but it may become an issue when the mortgage company or its loan officers are generating multiple one-off advertisements with external entities, because often there is little control over the process and the efforts to ensure RESPA Section 8 compliance and gather appropriate documentation may be time consuming and inefficient.

Embodiments described herein solve these issues for mortgage companies and other entities incident to or part of real estate settlement services regarding federally related mortgage loans. Embodiments described herein calculate precise pro rata shares on any given co-marketed document by assigning each square millimeter of the co-marketed document to coordinates on a grid, then assigning individual co-marketer branding/advertising space to individual coordinates of the grid. Based on the number of grid coordinates assigned to each co-marketer, a percentage of overall marketing space each co-marketer occupies within the co-marketed document is calculated. Using information gathered through the workflow involved in generating a co-marketed document, these percentages are applied to the total expenses to arrive at the exact costs for each co-marketer. Payments are then collected and reports are generated, providing documentation that each co-marketer paid their fair share of total expenses and that no co-marketer defrayed costs for another co-marketer.

Embodiments described herein improve on previous RESPA Section 8 compliance approaches in several ways. First, some organizations subject to RESPA Section 8 compliance do not have a standard, repeatable process for determining what amount of space on a given co-marketed document should be allocated to each co-marketing party. Currently, some organizations have someone who will "eyeball" a co-marketed document and estimate the percentage of space that belongs to each co-marketing party. This method may be very imprecise, inaccurate, and inconsistent.

In contrast, within a system implementing the disclosed embodiments, a user (such as a compliance officer or other authority of a mortgage company) may retrieve a co-marketed document and determine precise pro rata shares for each co-marketing party by selecting, for example by clicking and dragging to highlight, the various areas of the document that belong to each co-marketing party. The system calculates the percentage of the overall co-marketed document belonging to a co-marketing party based on the number of grid coordinates assigned to the co-marketing party. The user may then "lock" that co-marketed document as a template so that pro rata shares and placement of branding/messaging or space allocations may not be changed for that co-marketed document.

Second, some organizations subject to RESPA Section 8 compliance do not currently have a mechanism to calculate 1) exact pro rata costs for a co-marketed document based on the determined co-marketer shares and 2) total costs for production and fulfillment of the co-marketed document. This process is generally manual, may become time consuming and inefficient, and includes an added margin for human error because of vendor inconsistency, lack of technology, or insufficient access to information for each co-marketing party.

In contrast, when a user uses a system that implements the disclosed embodiments to produce a co-marketed document, the system takes into account the number of pieces of the co-marketed document to be produced, the number of recipients (if applicable), and any postage or other costs associated with distributing the final product based on vendor pricing data stored in the system and print job details entered by the user (e.g., the number of recipients in a postal route, the number of records in an uploaded spreadsheet, etc.) The system applies the predetermined pro rata share percentages and calculates the total costs for each co-marketing party (including any contribution percentages required to be paid toward one co-marketing party's cost by the user, such as a loan officer's percentage of contribution toward the mortgage company's percentage of total costs).

Third, some organizations subject to RESPA Section 8 compliance do not currently have a mechanism to document how pro rata shares of a co-marketed document were determined, other than noting the percentages determined from "eyeballing" the co-marketed document. Such documentation may be necessary for various purposes, such as record retention, as proof of RESPA Section 8 compliance in the event of an audit, etc.

In contrast, the disclosed embodiments record the areas designated to each co-marketing party, then provide a graphical record of the designated areas along with the percentages of the total space of a co-marketed document that was assigned to each co-marketing party.

Some organizations subject to RESPA Section 8 compliance do not have a mechanism that generates all documentation required by state and federal regulations for a given document. Some organizations gather this documentation manually and enter it into a form, a database, or a project management system.

In contrast, a system implementing the disclosed embodiments produces, for example, specifically for record retention purposes, a summary document that is generated from all information collected by the activity in the system (e.g., who generated the co-marketed document, the co-marketing parties, the method of delivery, pro rata share calculations, payments by each co-marketing party, receipts, marketing expense contribution amounts, distribution dates and locations, information lenders need to retain appropriate advertising records, etc.)

In this disclosure, the terms "co-marketed real estate document" and "co-marketed document" are synonymous, the terms "loan officer" and "lender" are synonymous, the terms "real estate agent," "realtor," and "agent" are synonymous, and the terms "co-marketer" and "co-marketing party" are synonymous.

FIG. 1 is an example of a co-marketed advertisement, according to an embodiment. A co-marketed advertisement is a type of co-marketed document which includes at least two areas, with each area corresponding to a respective co-marketer. For example, in FIG. 1, the document is co-marketed by real estate agent "Person A" and loan officer "Person B." Two or more entities may co-market a co-marketed document.

A co-marketed document may be a printed document, such as a flyer or postcard, or may be electronic, such as a file included in an email or presented on a website. The co-marketed document of FIG. 1 is a postcard that is to be printed and mailed using a postal service such as the United States Postal Service. The postcard includes a front portion 104 and a back portion 106.

FIG. 2 illustrates an example user interface 200 including a markup editor 204 for selecting regions of a co-marketed document corresponding to a plurality of co-marketers, according to an embodiment. Each co-marketer in the plurality of co-marketers may be designated as a co-marketer type. As illustrated in FIG. 2, the user interface 200 is displayed within a web page; however, the user interface 200 could alternatively be displayed by a separate program executing on a client computer.

The markup editor 204 includes a document area 206, where a co-marketed document is displayed. A user may use the document area 206 of markup editor 204 to select an area of the co-marketed document and designate the selected area as corresponding to one of the co-marketer types.

A user may edit the document in the document area 206 of markup editor 204. A user may be the co-marketer or may be associated with a co-marketer. A user may be the co-marketer, such as the realtor or lender, or the user may be an associate of the co-marketer such as an administrative assistant or graphical designer. A user is associated with a co-marketer type. For example, a realtor and the realtor's associates that may edit the co-marketed document may be one co-marketer type, while a lender and the lender's associates that may edit the co-marketed document may be another co-marketer type. If areas of the co-marketed document have been designated as corresponding to one of the co-marketer types, a user may only edit the areas corresponding to the user's co-marketer type.

The term "button" includes any user interface control, which, upon being selected, starts an event, dispatches a message, or otherwise indicates that some functionality associated with the user interface control is to be executed.

The markup editor 204 includes co-marketer selection controls that allow a user to select a co-marketer type. The markup editor 204 includes at least one co-marketer type selection control for each co-marketer. For example, as shown in the example user interface 200 in FIG. 2, the markup editor 204 includes the buttons "Mark Lender" 208 and "Mark Agent" 210. Upon selecting a co-marketer type, the user is able to mark-up the area(s) of the co-marketed document in the document area 206 that correspond to that co-marketer type.

The markup editor 204 includes a legend that displays the mark-up decoration for each co-marketer type. A mark-up decoration may be a color used to shade a selected area of a co-marketed document, a cross-hatching of a selected area of a co-marketed document, a pattern used to fill a selected area of a co-marketed document, etc. For example, as shown in the example user interface 200 in FIG. 2, the markup editor 204 includes the labels "Lender Area" 212 and "Agent Area" 214. The label "Lender Area" 212 is decorated with slanted lines, indicating that any selected area(s) corresponding to the lender co-marketer will be decorated with slanted lines. The label "Agent Area" 214 is decorated with a diamond hatch, indicating that any selected area(s) corresponding to the agent co-marketer will be decorated with a diamond hatch.

The markup editor 204 includes a control that, when selected, causes the co-marketing shares of the document to be calculated. For example, as shown in the example user interface 200 in FIG. 2, the markup editor 204 includes the "CALC %" button 216.

The markup editor 204 includes one or more controls that display the pro rata shares of the total co-marketing space within the co-marketed document. For example, as shown in the example user interface 200 in FIG. 2, the markup editor 204 includes the label "Lender's Share" 218, which will display the pro rata share for the lender co-marketer type, and the label "Agent's Share" 220, which will display the pro rata share for the agent co-marketer type.

The markup editor 204 includes a label that displays legal information, such as legal disclaimers, and a checkbox control, which, when checked, indicates the user's acceptance and/or understanding of the displayed legal information. For example, as shown in the example user interface 200 in FIG. 2, the legal info label 222 displays legal information, and the legal info checkbox 224 allows the user to indicate the user's acceptance and/or understanding of the displayed legal information.

The markup editor 204 includes a control that allows the user save the marked-up areas of the co-marketed document. For example, as shown in the example user interface 200 in FIG. 2, the markup editor 204 includes the button "Save Markup" 226. Upon the user clicking this button, the co-marketed document and the marked-up areas of the co-marketed document are saved in the system; no further modifications of either the co-marketed document or the co-marketed document's markup are possible. The saved co-marketed document may be stored as a template for future use. In an example, the template version may not be further modified, but may be used by a user as a basis for a new co-marketed document. This is advantageous for co-marketers that wish to maintain consistency between their co-marketed documents.

Figure 3:
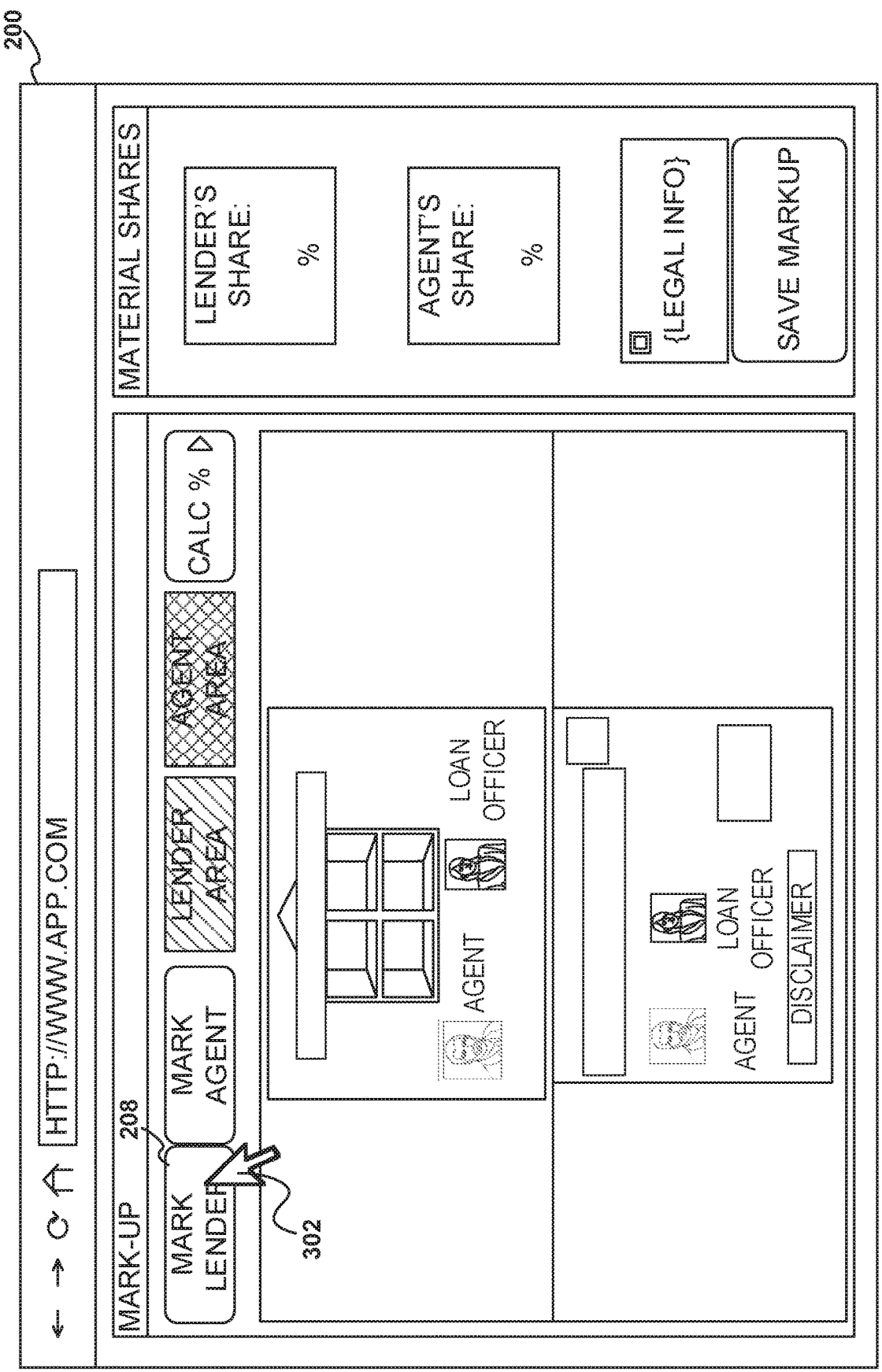
FIG. 3 illustrates a user beginning the mark-up process by selecting to mark-up the area(s) of a document corresponding to a first co-marketer type, according to an embodiment.

FIG. 3 illustrates a user beginning the mark-up process by selecting to mark-up the area(s) of a co-marketed document corresponding to a first co-marketer type, according to an embodiment. The co-marketed document is loaded into the user interface 200 prior to the user beginning the mark-up process. The co-marketed document may be created or selected in various ways. For example, the user may select an already existing co-marketed document from the user's computer, from within the co-marketing system, from the Internet, etc. The user may use the co-marketing system to create a new co-marketed document. The user may select an existing template to edit and create a new co-marketed document.

When the user is ready to begin the mark-up process, the user selects a co-marketer selection control to begin marking-up areas of the co-marketed document that correspond to the co-marketer type associated with the selected co-marketer selection control. For example, as illustrated in FIG. 3, the user selects the "Mark Lender" button 208 to begin marking-up the areas of the co-marketed document corresponding to the lender. As illustrated in FIG. 3, the user selects the "Mark Lender" button 208 by using cursor 302 to click the "Mark Lender" button 208; however, other selection mechanisms, such as keyboard shortcuts, are also possible. In an embodiment, upon selection/creation of a co-marketed document, the user interface 200 may automatically select one of the co-marketers, so that instead of having to first select a co-marketer, the user may begin marking-up the areas of the co-marketed document corresponding to the automatically selected co-marketer. In an embodiment, a user may be associated with a co-marketer type based on the user's credentials. The system may recognize the user's co-marketer type and only permit the user to edit the portions of the co-marketer document associated with that co-marketer type. In an embodiment, when a user associated with a co-marketer type edits areas of the co-marketed document, the system may automatically mark the edited areas of the co-marketed document as corresponding to the user's co-marketer type.

Figure 4:
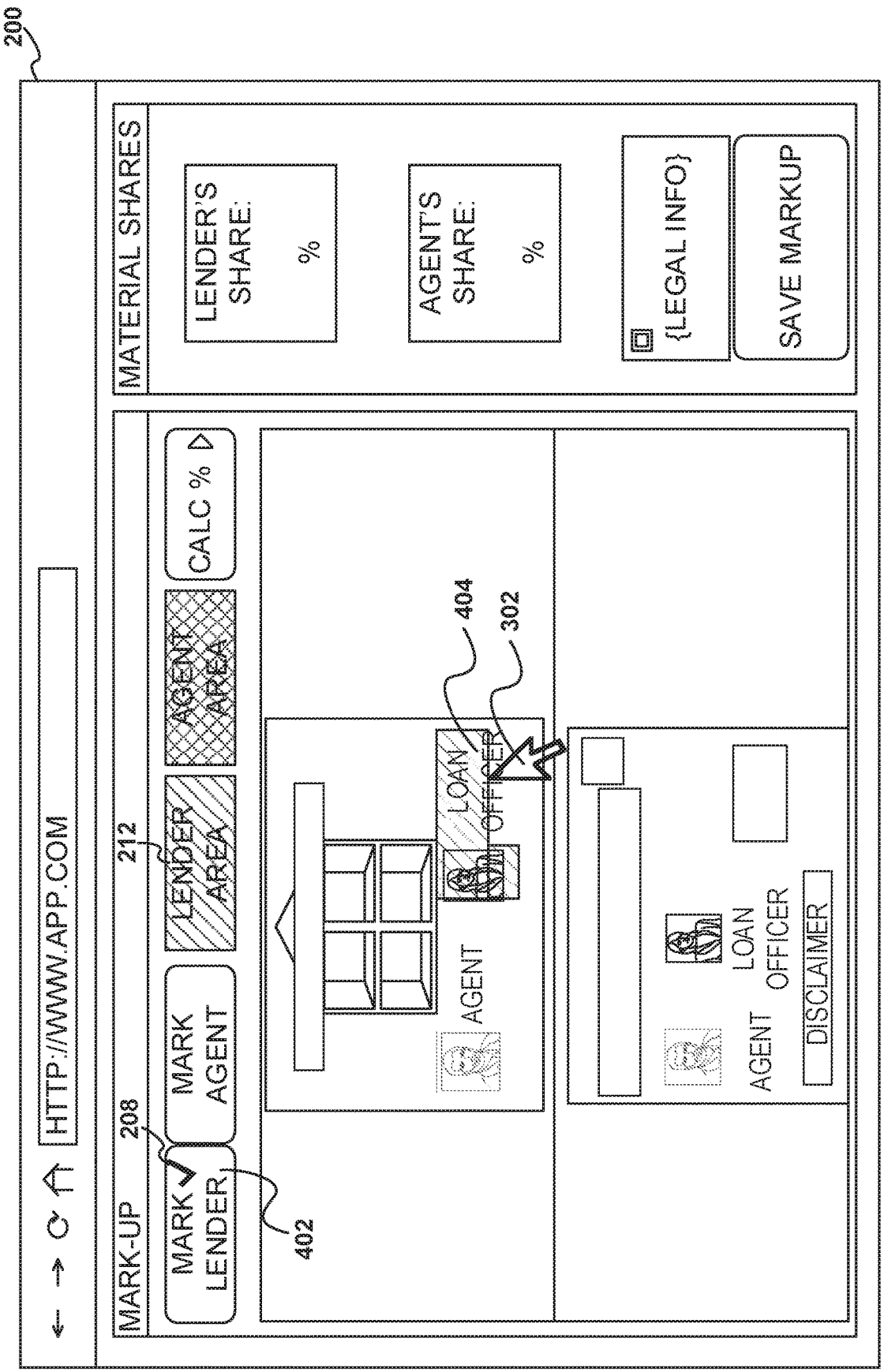
FIG. 4 illustrates a user marking-up the area(s) of a document corresponding to a first selected co-marketer type, according to an embodiment.

FIG. 4 illustrates a user marking-up the area(s) of an document corresponding to a first selected co-marketer type, according to an embodiment. The co-marketer type selection control that was most recently selected is visually indicated in the markup editor 204. For example, FIG. 3 illustrated the user clicking on the "Mark Lender" button 208, thus, as illustrated in FIG. 4, the "Mark Lender" button 208 is indicated as selected by a checkmark 402. Although FIG. 4 illustrates a selected co-marketer type selection control as including a checkmark 402, a co-marketer type selection control may include one or more of a checkmark 402, shading, crosshatching, a filled-in color, etc.

The user marks-up an area of the co-marketed document by selecting the area. As illustrated in FIG. 4, the user has partially marked-up an area 404 corresponding to the lender by clicking and dragging the cursor 302 over the area of the co-marketed document corresponding to the lender. In an embodiment, the tool presented for the user to mark-up an area is a tool for drawing a rectangular shape. The when the user clicks, a corner of the rectangle is set and as the user drags the cursor, the size of the rectangle changes as the cursor moves farther or closer to the original click point. The cursor controls the corner of the rectangle opposite to the corner placed with the original click. When the user stops dragging the drawn rectangle represents the selected area. In another embodiment, the tool may allow the user to create a multi-sided polygon for designating the selected area. A multisided polygon may be useful for instances when the area the user wishes to select does not fit well within a rectangular shape. The user may click a series of points to designate the vertices of the polygon. The area enclosed by the polygon may designate the selected area.

A marked-up area is decorated with the same decoration as the label corresponding to the selected co-marketer type. For example, as illustrated in FIG. 4, the currently selected area 404, which corresponds to the lender, is decorated with slanted lines just as the "Lender Area" label 212, which corresponds to the lender, is decorated with slanted lines. To unmark a previously selected area, the user selects the area to "unselect" the area.

Figure 5:
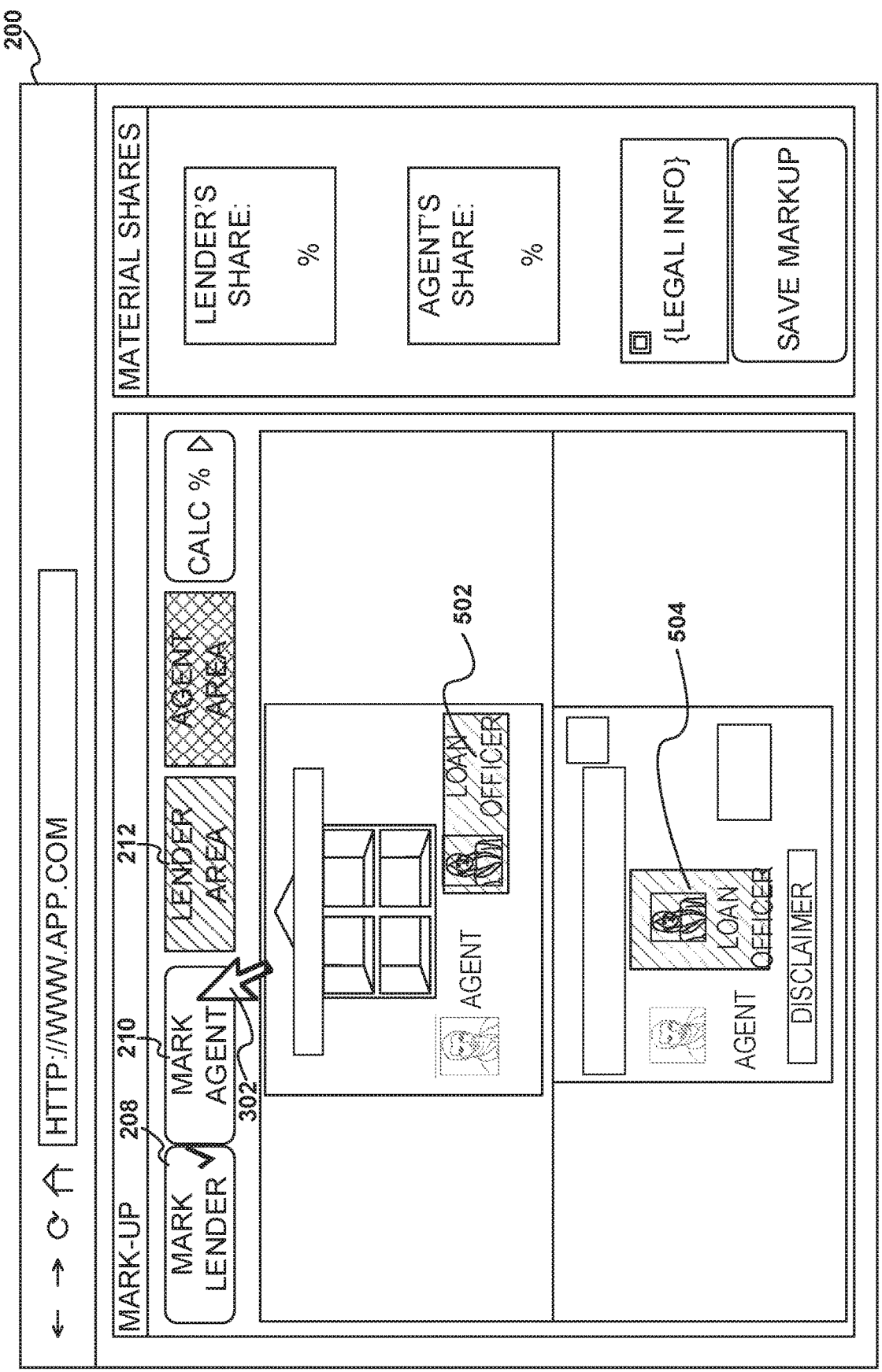
FIG. 5 illustrates a user continuing the mark-up process by selecting to mark-up the area(s) of a co-marketed document corresponding to a second co-marketer type, according to an embodiment.

FIG. 5 illustrates a user continuing the mark-up process by selecting to mark-up the area(s) of a co-marketed document corresponding to a second co-marketer type, according to an embodiment. The user may have already completed marking-up the area(s) of the co-marketed document corresponding to the first co-marketer type, or simply wants to switch to another co-marketer type and later return to mark-up the area(s) corresponding to the first co-marketer type. As illustrated in FIG. 5, the user has already marked-up the areas 502, 504 of the co-marketed document corresponding to the lender.

The user selects a second co-marketer type selection control (other than the co-marketer type selection control currently selected) to begin marking-up the area(s) of the co-marketed document that correspond to the second co-marketer type. For example, as illustrated in FIG. 5, the user selects the "Mark Agent" button 210 to begin marking-up the areas of the co-marketed document corresponding to the agent. As illustrated in FIG. 5, the user selects the "Mark Agent" button 210 by using cursor 302 to click the "Mark Agent" button 210; however, other selection mechanisms, such as keyboard shortcuts, are also possible.

Figure 6:
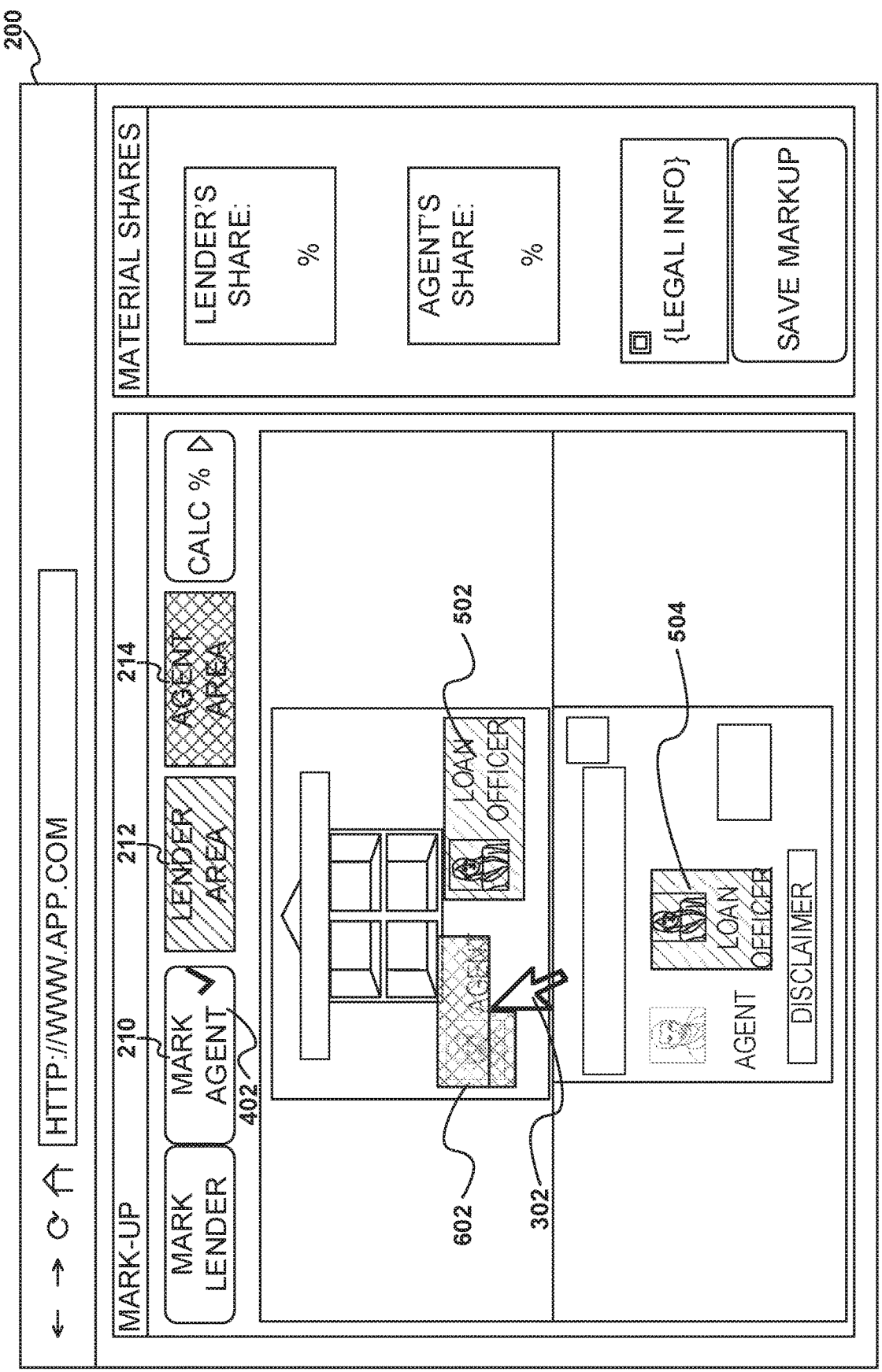
FIG. 6 illustrates a user marking-up the area(s) of a document corresponding to a second selected co-marketer type, according to an embodiment.

FIG. 6 illustrates a user marking-up the area(s) of a document corresponding to a second selected co-marketer type, according to an embodiment. In the example illustrated in FIG. 6, the second co-marketer type is the agent and the user has clicked the "Mark Agent" button 210; thus, the "Mark Agent" button 210 is indicated as selected by a checkmark 402.

Similarly to the area(s) corresponding to the first co-marketer type, the user marks-up the area(s) corresponding to the second co-marketer type by selecting the area(s). As illustrated in FIG. 6, the user has partially marked-up an area corresponding to the agent by clicking and dragging the cursor 302 over the area of the co-marketed document corresponding to the agent. As illustrated in FIG. 6, the currently selected area 602, which corresponds to the agent, is decorated with a diamond hatch just as the "Agent Area" label 214, which corresponds to the agent, is decorated with a diamond hatch.

Figure 7:
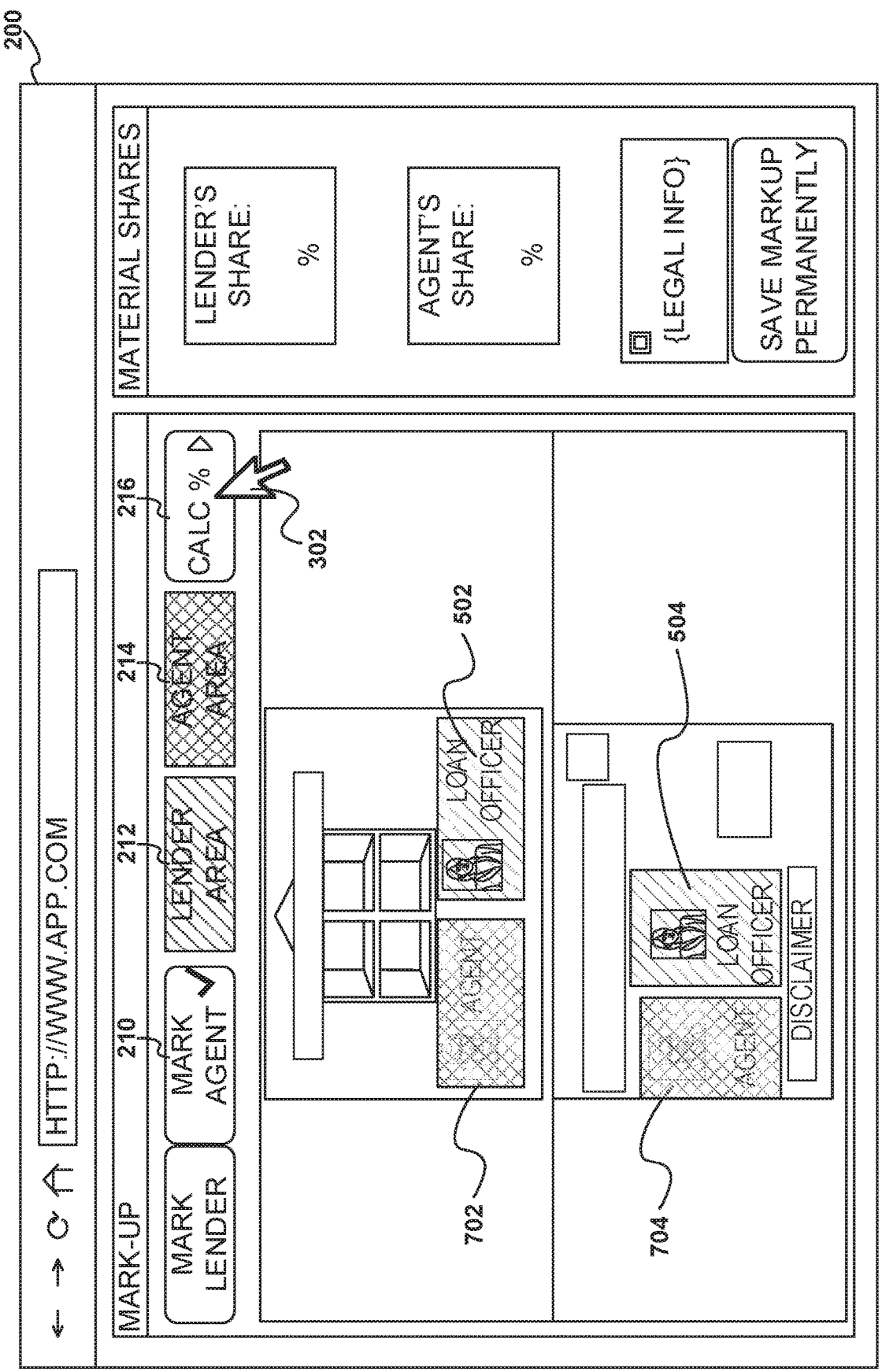
FIG. 7 illustrates a user selecting a control to direct the system to calculate the pro rata document share for each co-marketer type of the co-marketed document, according to an embodiment.

FIG. 7 illustrates a user selecting a control to direct the system to calculate the pro rata document share for each co-marketer type of the co-marketed document, according to an embodiment. As illustrated in FIG. 7, the user has marked-up the lender areas 502, 504 and the agent areas 702, 704, and now wants the system to calculate the pro rata document shares based on the marked-up areas. The system may use various measurement techniques to determine the area of the selected areas, such as pixels or standard measures like inches or centimeters. To instruct the system to calculate the pro rata document shares, the user may select the "CALC %" button 216. Upon the user selecting the "CALC %" button 216, the system calculates the total of the marked-up area(s) of the co-marketed document. The system then calculates each co-marketer type's percentage of the total marked-up area(s). For example, in a scenario, the system determines the marked-up area for a first co-marketer type is 20 square centimeters and the marked-up area for a second co-marketer type is 30 square centimeters. The total marked-up are is 50 square centimeters. The percentage for the first co-marketer type is 40% and the percentage for the second co-marketer type is 60%. The percentages are then displayed in user interface 200. If the user makes further mark-up changes, the "CALC %" button 216 is clicked to update the co-marketer type's shares to reflect the mark-up changes.

In an embodiment, rather than having a calculation button 216, the user interface 200 automatically calculates the co-marketer shares as the user makes mark-up changes to the co-marketed document. In such an embodiment, co-marketer shares always reflect the current state of the co-marketed document's mark-up. As the user changes the size of the marked-up area, such as when the user clicks and drags a cursor for creating or modifying a selection area, the calculation occurs in real-time with the percentage display for each co-marketer type updated corresponding to the size changes.

Figure 8:
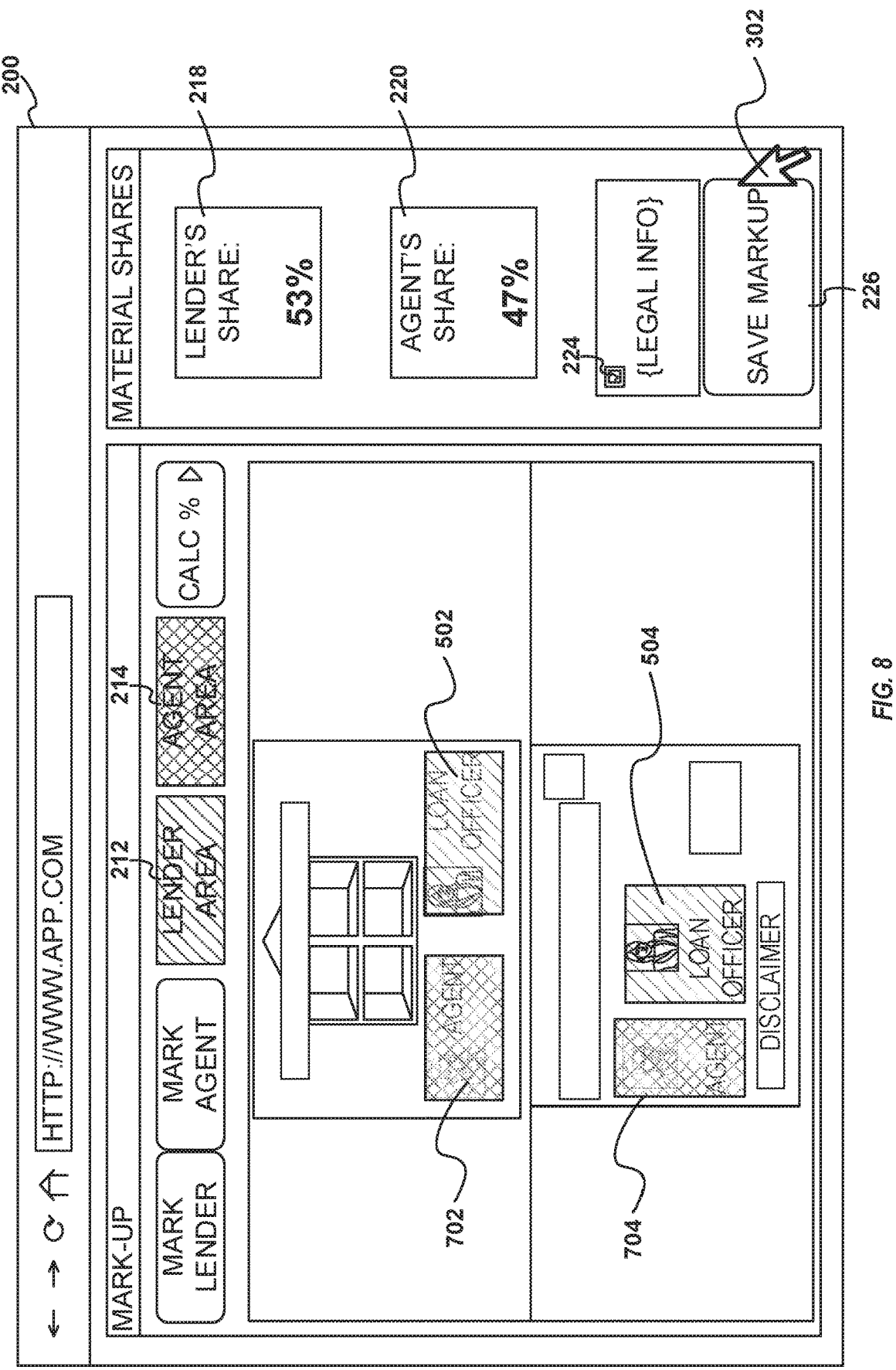
FIG. 8 illustrates a user selecting a control to direct the system save the mark-up permanently, according to an embodiment.

FIG. 8 illustrates a user selecting a control to direct the system save the mark-up permanently, according to an embodiment. When the user is satisfied that the co-marketed document and the calculated pro rata share for each co-marketer type are compliant with RESPA Section 8, the user checks the legal info checkbox 224 to indicate the user's acceptance and/or understanding of the legal information displayed in legal info label 222. Upon the legal info checkbox 224 being checked, the "Save Markup" button 226 becomes enabled. The user may then select the "Save Markup" button 226, for example by clicking the button with cursor 302. Upon the "Save Markup" button 226 being selected, the system saves the co-marketed document and its associated mark-up, and prevents any further modifications to either.

Figure 9:
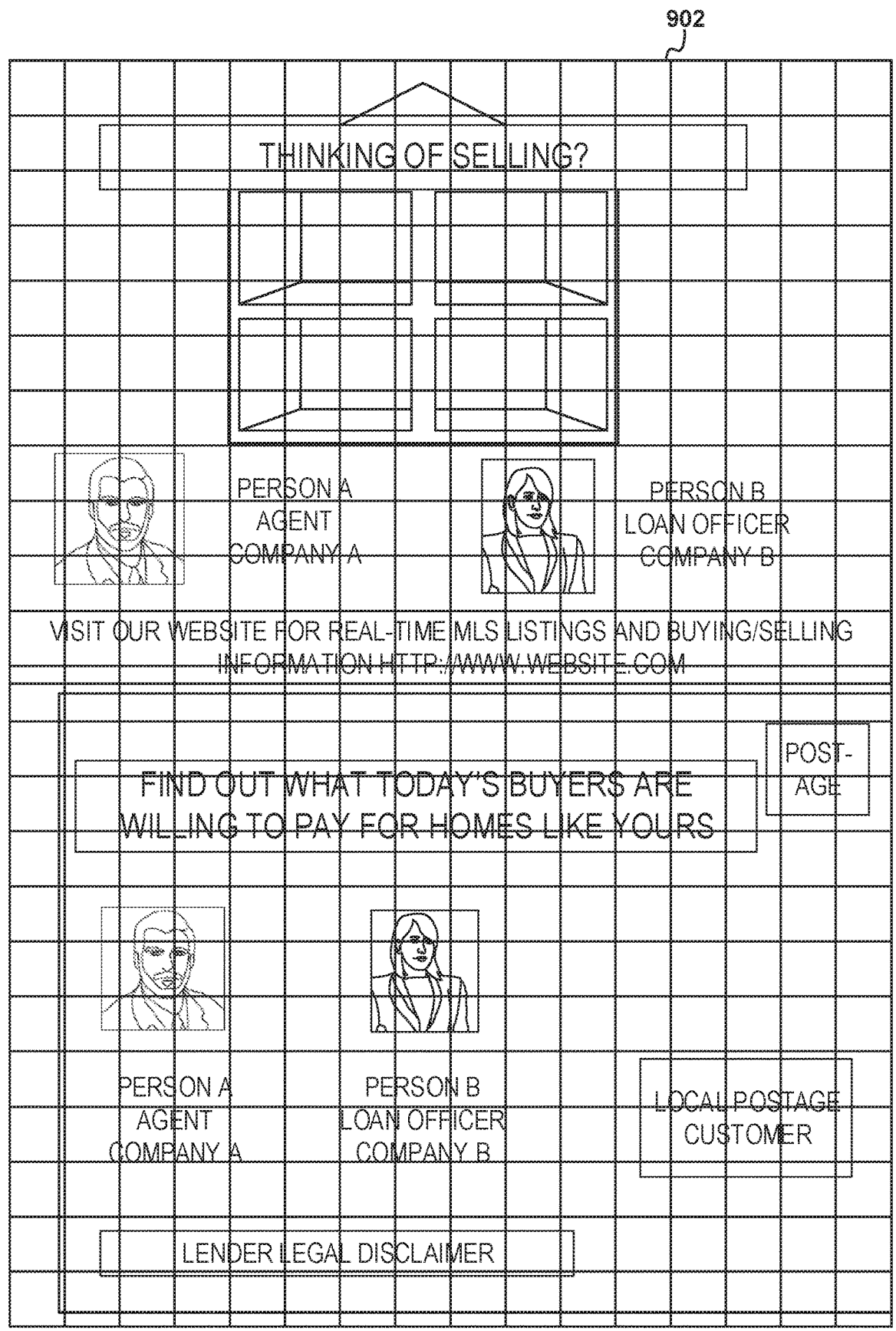
FIG. 9 illustrates an example co-marketed document that is overlaid with an example virtual grid, according to an embodiment.

FIG. 9 illustrates an example co-marketed document that is overlaid with an example virtual grid 902, according to an embodiment. A co-marketed document is overlaid with such a virtual grid 902 within the markup editor 204. Depending on the embodiment, the markup editor 204 may have only one virtual grid 902 that overlays the entire co-marketed document, or may have one virtual grid 902 for each individual portion (e.g., front and back) of the co-marketed document. The grid 902 is "virtual" because the gridlines of the grid 902 are not typically displayed when a co-marketed document is overlaid with the grid 902 and displayed in the markup editor 204.

The virtual grid 902 is comprised of equally sized squares. The size of each square is configurable; a typical value is 5 mm per side, for a total area of 25 $mm^2$ per square. The virtual grid 902 uses a coordinate system (e.g., Cartesian), and each square within the virtual grid 902 has a unique coordinate value within the coordinate system. Each square within the virtual grid 902 is individually selectable.

Figure 10:
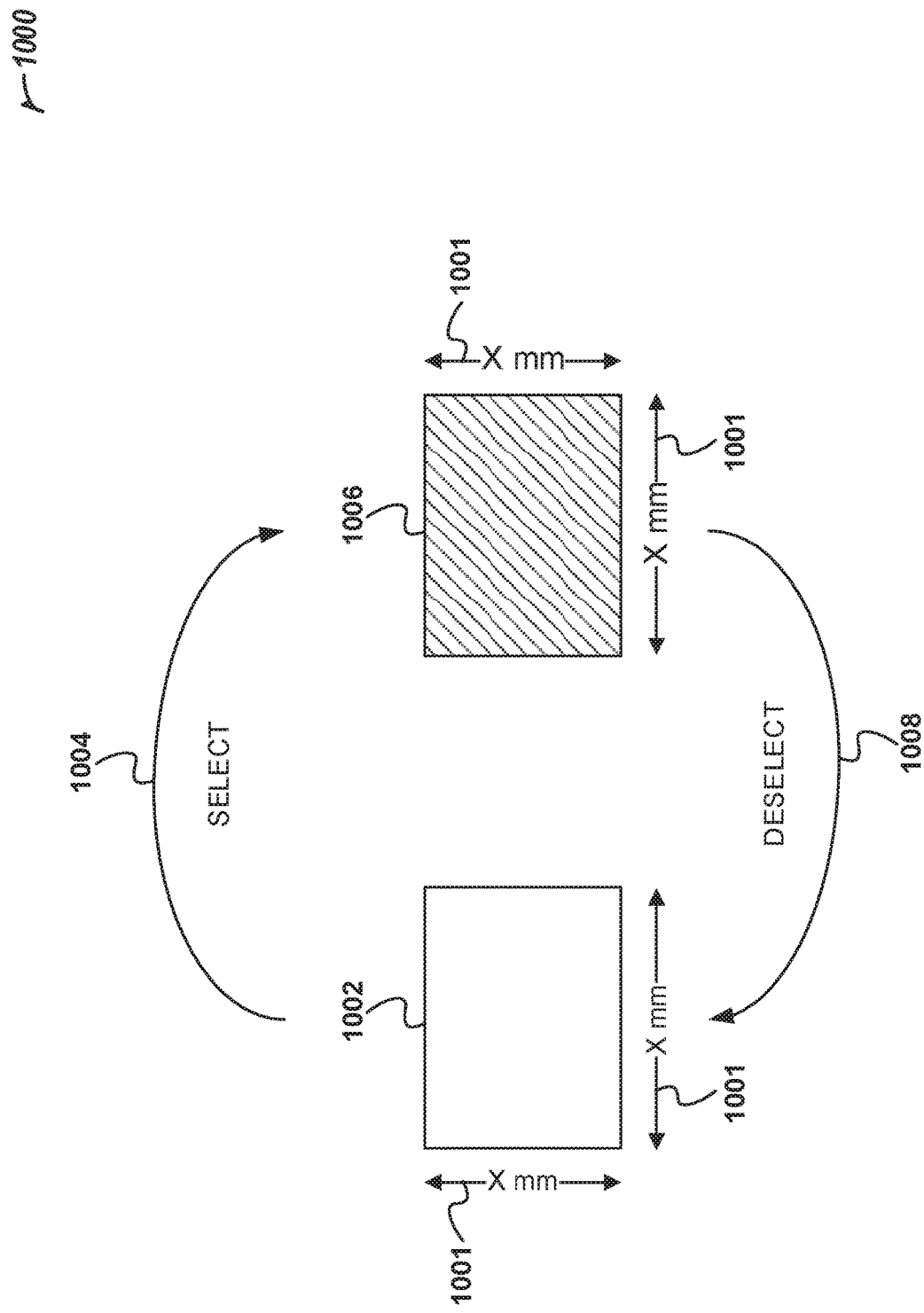
FIG. 10 illustrates toggling between selected and unselected states of a square of a virtual grid, according to an embodiment.

FIG. 10 illustrates toggling between selected and unselected states of a square of a virtual grid 902, according to an embodiment. The square has sides that are X mm in length 1001. State 1002 represents a square in an unselected state; this is the state of each square of a new virtual grid 902, and the state of a square after the square has been deselected. State 1006 represents a square in a selected state; this is the state of a square after the square has been selected in the mark-up process (illustrated in FIGS. 3-8 and described in the corresponding paragraphs). When a square is in state 1006 (selected), the square is decorated according to the decoration chosen for the currently selected co-marketer type. To transition from unselected state 1002 to selected state 1006, the square is selected 1004 (e.g., clicked) within user interface 200. To transition from selected state 1006 to unselected state 1002, the square is deselected 1008 (e.g., clicked again) within user interface 200.

Figure 11:
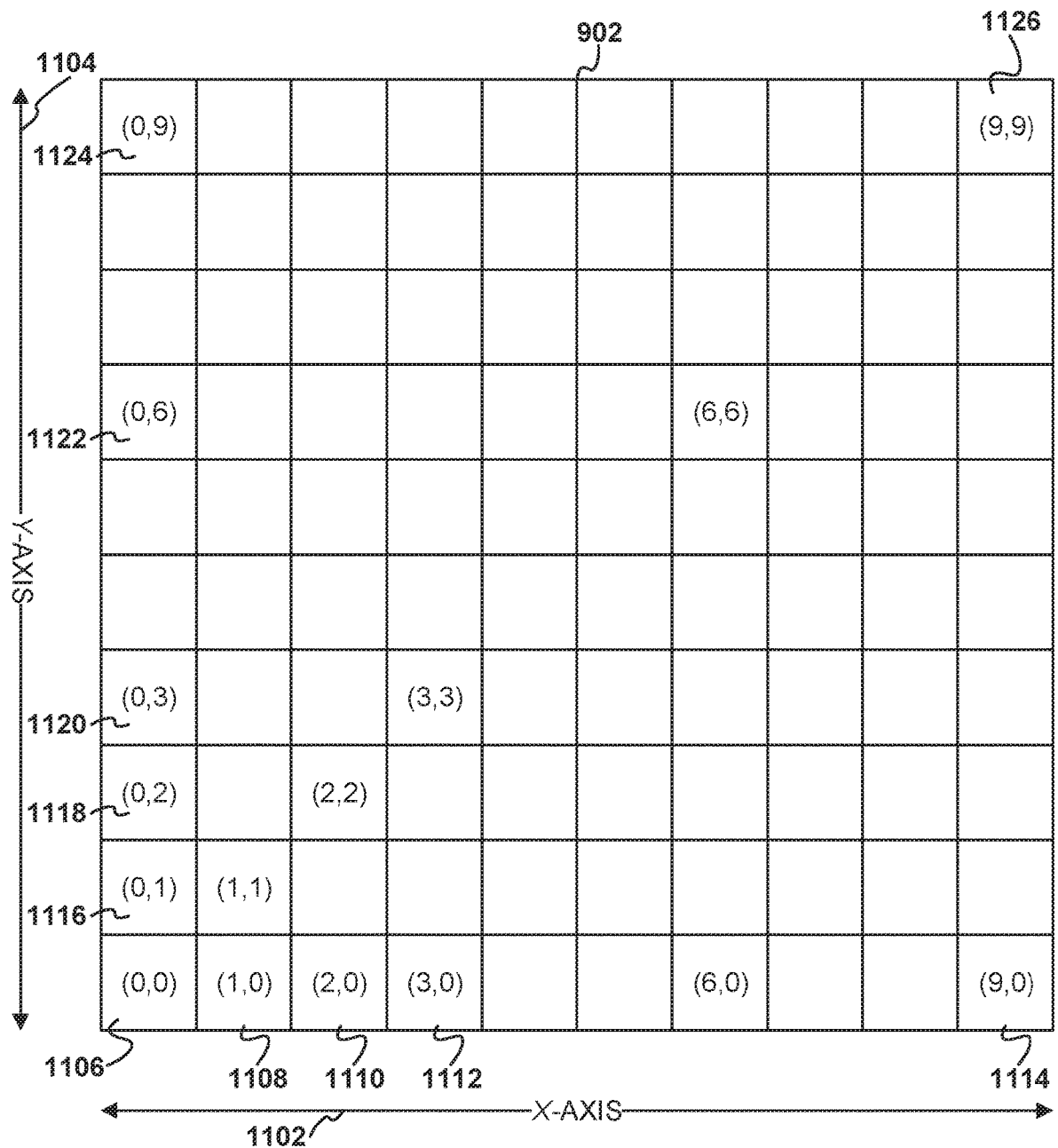
FIG. 11 illustrates an example virtual grid that is overlaid on a co-marketed document, according to an embodiment.

FIG. 11 illustrates an example virtual grid 902, according to an embodiment. A virtual grid 902 uses a coordinate system to address each square within the virtual grid. The example virtual grid 902 illustrated in FIG. 11 uses a Cartesian coordinate system, which is a coordinate system that specifies each point uniquely in a geometric plane by a pair of numerical coordinates, which, for a particular point P, are the signed distances from P to two fixed perpendicular directed lines, measured in the same unit of length. The coordinates are written as an ordered pair (x, y). Each reference line is called a "coordinate axis" (or just "axis") of the system, and the point where they meet is its "origin," usually at ordered pair (0, 0). The coordinates may be defined as the positions of the perpendicular projections of the point onto the two axes, expressed as signed distances from the origin. For a given point P, a line is drawn through P perpendicular to the x-axis 1102 to meet it at X and second line is drawn through P perpendicular to the y-axis 1104 to meet it at Y. The coordinates of P are then X and Y interpreted as numbers x and y on the corresponding number lines.

By convention, the origin (the point where the x-axis 1102 and y-axis 1104 intersect) is located in the bottom-left corner of the example virtual grid 902; however, the origin may be placed at any of the other three corners of the virtual grid 902. Each square is uniquely addressable by the numerical coordinates of the square. For example, the square with reference numeral 1106 has coordinates (0,0). The square with reference numeral 1108 has coordinates (1,0), the square with reference numeral 1110 has coordinates (2,0), etc.

Figure 12:
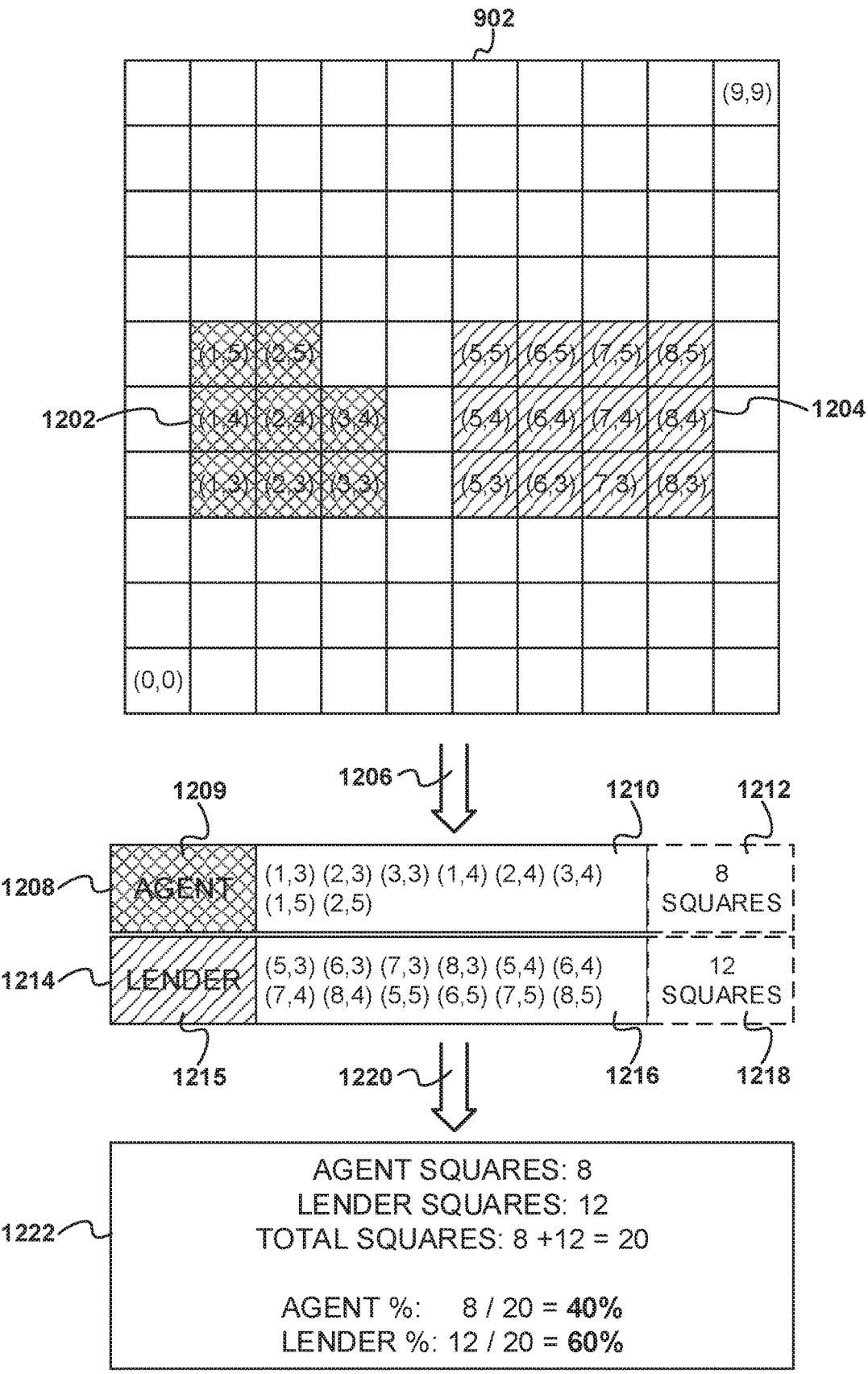
FIG. 12 illustrates an example of calculating the pro rata shares of a co-marketed document for each of two co-marketer types, according to an embodiment.

FIG. 12 illustrates an example of calculating the pro rata shares of a co-marketed document for each of two co-marketers, according to an embodiment. The area of the example virtual grid 902 corresponding to the agent ("agent area" 1202) and the area of the example virtual grid 902 corresponding to the lender ("tender area" 1204) have already been marked-up. As illustrated in FIG. 12, agent area 1202 includes the grid coordinates (1,3), (2,3), (3,3), (1,4), (2,4), (3,4), (1,5), and (2,5), and lender area 1204 includes the grid coordinates (5,3), (6,3), (7,3), (8,3), (5,4), (6,4), (7,4), (8,4), (5,5), (6,5), (7,5), and (8,5).

The agent area 1202 and the lender area 1204 are converted (operation 1206) into data structures 1208, 1214 to represent the agent area 1202 and the lender area 1204, respectively. Each data structure 1208, 1214 includes an identifier 1209, 1215 that identifies which co-marketer of the example virtual grid 902 the data structure 1208, 1214 represents. Each data structure 1208, 1214 includes a set of grid coordinates 1210, 1216 that includes the grid coordinates from the marked-up area 1202, 1204 of the corresponding co-marketer type. Each data structure 1208, 1214, optionally includes an integer 1212, 1218 representing the quantity of grid coordinates in the set of grid coordinates 1210, 1216 of the data structure 1208, 1214.

The data structures 1208, 1214 are provided (operation 1220) to a pro rata shares calculation 1222, which uses the data structures 1208, 1214 to calculate the pro rata share for each co-marketer type. As illustrated in FIG. 12, the data structure 1208 representing the agent has 8 grid coordinates (or "squares") in its set of grid coordinates 1210, and the data structure 1214 representing the lender has 12 grid coordinates in its set of grid coordinates 1216; thus, the pro rata shares calculation 1222 calculates the total number of grid coordinates amongst the co-marketers as follows: 8+12=20. The pro rata shares calculation 1222 then calculates the pro rata share for each co-marketer as follows: the agent has 8/20=40%, and the lender has 12/20=60%.

Figure 17:
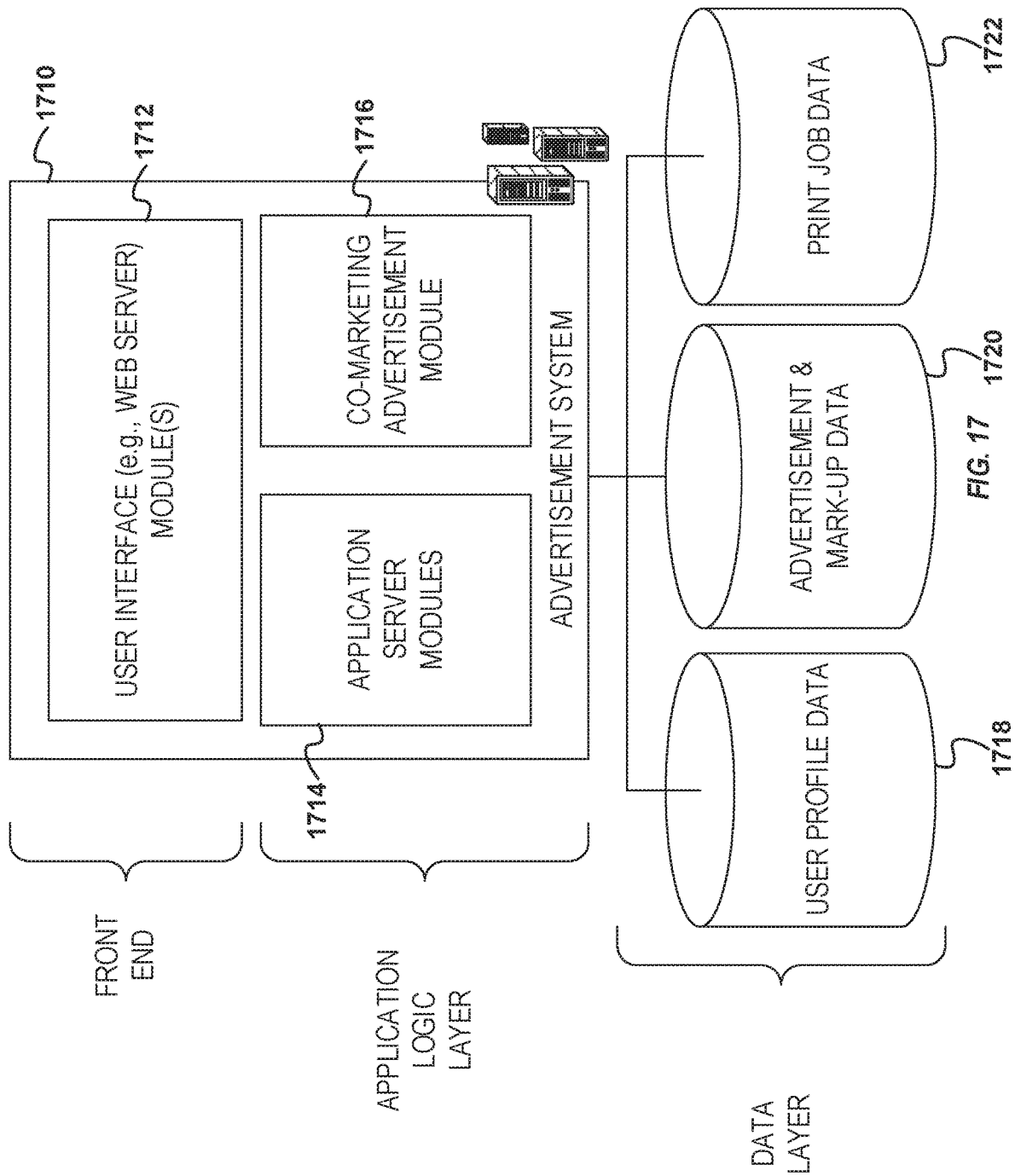
FIG. 17 is a block diagram illustrating various components of a document system, according to an embodiment.

In an embodiment, part or all of the calculations illustrated in FIG. 12 are performed on the client (e.g., user's) machine; in another embodiment, part or all of the calculations illustrated in FIG. 12 are performed on a server machine, such as described in FIG. 17.

Figure 13:
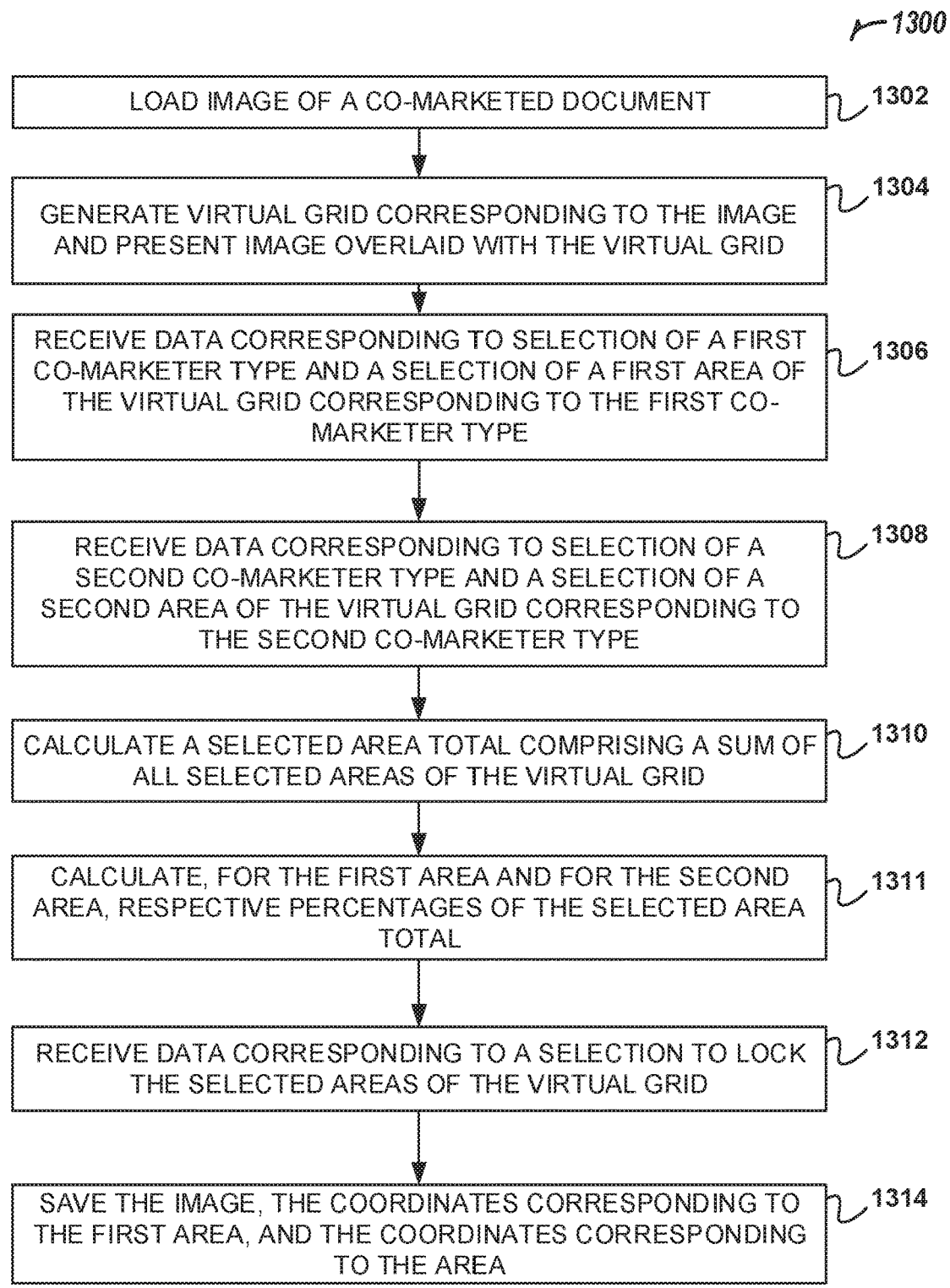
FIG. 13 is a flow diagram illustrating a method for determining pro rata shares of a co-marketed document, according to an embodiment.

FIG. 13 is a flow diagram illustrating a method 1300 for determining pro rata shares of a co-marketed document, according to an embodiment. Data representing an image of a co-marketed document, such as the co-marketed advertisement illustrated in FIG. 1 and described in the accompanying paragraphs, is loaded (operation 1302) into the system. A virtual grid, such as the example virtual grid 902 illustrated in FIG. 11 and described in the accompanying paragraphs, is generated, and the image of the co-marketed document overlaid with the virtual grid is presented to a user (operation 1304). Data corresponding to selection of a first co-marketer type and a selection of a first area of the virtual grid corresponding to the first co-marketer type is received (operation 1306), for example as illustrated in FIGS. 3-4 and described in the accompanying paragraphs. Data corresponding to selection of a second co-marketer type and a selection of a second area of the virtual grid corresponding to the second co-marketer type is received (operation 1308), for example as illustrated in FIGS. 5-6 and described in the accompanying paragraphs. A selected area total, comprising a sum of all selected areas of the virtual grid, is calculated (operation 1310), for example as illustrated in FIG. 12 and described in the accompanying paragraphs. For each co-marketer type, a percentage of the total selected area corresponding to that co-marketer type is calculated (operation 1311), for example as illustrated in FIG. 12 and described in the accompanying paragraphs. Data corresponding to a selection to lock the selected areas of the virtual grid is received (operation 1312), for example as illustrated in FIG. 8 and described in the accompanying paragraphs. The data corresponding to the image of the co-marketed document, the coordinates corresponding to the first area of the image, and the coordinates corresponding to the second area of the image are saved (operation 1314). No further modifications to the data corresponding to the image of the co-marketed document or the marked-up areas of the corresponding virtual grid are allowed.

After a user has permanently saved the mark-up for a co-marketed document, the system requests approval of the co-marketed document and its associated mark-up from one or more users. For example, if a loan officer marked-up a document co-marketed with an agent, the agent or the agent's brokerage may approve the mark-up of the co-marketed document. As another example, a user responsible for RESPA compliance at either or both of the mortgage company and the real estate brokerage may approve the mark-up of the co-marketed document. This approval process ensures that co-marketed documents generated through the system by end users adhere to the approved pro rata shares designated for each co-marketer.

After a co-marketed document and its associated mark-up have been approved, the co-marketed document and its associated mark-up are saved as a template that is available for future mailings based upon that co-marketed document. Templates may be marked up on a one-at-a-time or per-print-job basis.

A user of the system may have various information associated with the user. For example, a profile for a user may have associated headshots, graphics, logos, contact information, disclosures, or messages. The system uses the profile information associated with a co-marketer to populate template areas that may be designated to that co-marketer. Co-marketer profiles may be connected to one another within the system; thus, a co-marketer may be able to initiate the generation of co-marketing materials using any approved template that is authorized for use by the co-marketer(s) with whom they will co-market.

To initiate generation of a co-marketed document, a user may select a template and a co-marketer. Selecting a co-marketer, such as a realtor, may trigger the population of content for the co-marketer into the pre-defined spaces allocated to a co-marketer type on the template. Another co-marketer, such as a lender, may be selected for another co-marketer type on the template. This may trigger the population of content for the lender into the pre-defined spaces allocated to the lender's co-marketer type on the template. Once the co-marketers have been selected and their information populated, the user may then select the method for production (typically, print) of the co-marketed document and an option for its distribution (e.g., direct mail). The system may calculate total costs for each co-marketer based on each co-marketer's pro rata share of the total space.

If production of the co-marketed document requires approval, the system sends a production approval request to each party whose approval is required (e.g., a co-marketer, a manager of a co-marketer's organization, etc.). Upon receiving all required approvals, the system charges a co-marketer's share of expenses to the co-marketer's account within the system.

If a co-marketer's organization requires the co-marketer to contribute to the organization's percentage of expenses for the organization's co-marketer, the system calculates the amount due from the co-marketer. For example, 100% of a particular co-marketed advertisement costs $500. Co-marketer 1's branding/messaging appears on 72% of the co-marketed advertisement—a cost of $360. Co-marketer 2's branding/messaging appears on 28% of the mailer a cost of $140 but co-marketer 2's organization requires that the co-marketer contribute 50% to all marketing expenses attributed to the organization; therefore the final breakdown of costs returned would be as follows:

Co-marketer 1: $360 (72%), paid by co-marketer 1's organization

Co-marketer 2: $140 (28%), with $70 due from co-marketer 2 and $70 due from co-marketer 2's organization.

Upon receiving all payments necessary for a production run of a co-marketed document, the system triggers the generation of a report that documents all details of the print job from start to finish, including payments, copies of final artwork of the co-marketed document, the marked-up coordinates of the virtual grid for the co-marketed document, a copy of the pro rata share designations, receipts, etc.

FIG. 14 illustrates an example of a print job summary 1402 for a particular print job of a co-marketed document, according to an embodiment. A print job summary is created for each print job of a co-marketed document. A print job summary may be retrieved for compliance purposes, in the event of an audit, etc. The example print job summary 1402 includes a general summary 1404, as well as co-marketer specific summary information 1406, 1408 for each co-marketer on the co-marketed document.

General summary 1404 includes information regarding which user generated the print job, when the print job was generated, the quantity of the co-marketed document that was printed, the co-marketers featured in the document, the total charges for the print job, etc.

The co-marketer specific summary information 1406, 1408 includes the co-marketer's name, the date of the co-marketer's approval of the template for the print job, the amount due from the co-marketer's organization, the amount paid, the payment date, the payment type, etc.

FIG. 15 illustrates an example of a job payment receipt 1502 for a particular print job of a co-marketed document, according to an embodiment. A job payment receipt 1502 lists payment information for each payment that is made for a particular print job of a co-marketed document. Payment information for a payment includes identification of the co-marketer or co-marketing organization, the amount of the payment, an identification of the print job/order, etc.

Figure 16:
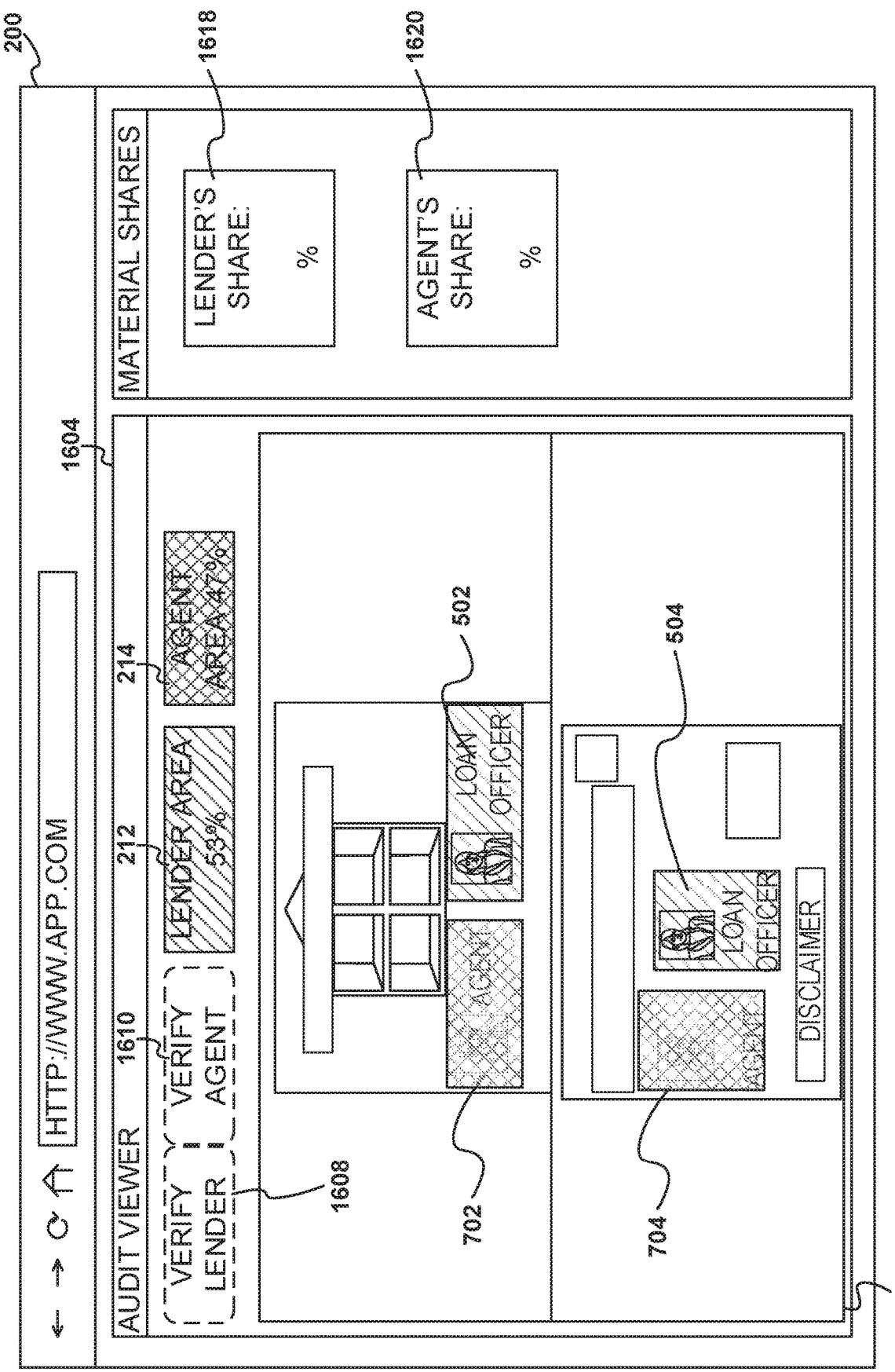
FIG. 16 illustrates an example user interface including an audit viewer, according to an embodiment.

FIG. 16 illustrates an example user interface 200 including an audit viewer 1604, according to an embodiment. A co-marketed document that is to be audited is loaded into the user interface 200 by the auditor selecting a co-marketed document that has been permanently saved, such as illustrated in FIG. 8 and described its accompanying paragraphs.

The audit viewer 1604 includes a document area 1606, where a co-marketed document and the mark-up associated with the co-marketed document are displayed. Although a co-marketed document and the mark-up associated with the co-marketed document are displayed within the document area 1606, no changes may be made to the mark-up associated with a permanently-saved co-marketed document.

Similar to the markup editor 204, the audit viewer 1604 includes a legend that displays the mark-up decoration associated with each co-marketer type of the co-marketed document. For example, as shown in the example user interface 200 in FIG. 16, the audit viewer 1604 includes the labels "Lender Area" 212 and "Agent Area" 214. The label "Lender Area" 212 is decorated with slanted lines, indicating that any marked-up area(s) corresponding to the lender co-marketer type are decorated with slanted lines. The label "Agent Area" 214 is decorated with a diamond hatch, indicating that any marked-up area(s) corresponding to the agent co-marketer type are decorated with a diamond hatch. As illustrated in FIG. 16, the loaded co-marketed document is displayed with marked-up lender areas 502, 504 and marked-up agent areas 702, 704, each of which had been previously associated with the co-marketed document (as illustrated in FIGS. 3-8 and described in the accompanying paragraphs). Each of marked-up lender areas 502, 504 and marked-up agent areas 702, 704 are decorated with the decoration associated with the respective co-marketer for that co-marketed document.

Similar to the markup editor 204, the audit viewer 1604 optionally includes co-marketer type selection controls that allow an auditor to select a co-marketer type. The audit viewer 1604 optionally includes at least one co-marketer type selection control for each co-marketer type. For example, as shown in the example user interface 200 in FIG. 16, the audit viewer 1604 includes the buttons "Verify Lender" 1608 and "Verify Agent" 1610. Upon selecting a co-marketer type, the auditor is able to verify the area(s) of the document in the document area 1606 that correspond to that co-marketer type by selecting one or more areas of the co-marketed document that the auditor considers to correspond to the co-marketer type. The one or more areas selected by the auditor are decorated, but with a different decoration than the marked-up areas that are associated with the permanently saved co-marketed document.

Similar to the markup editor 204, the audit viewer 1604 includes one or more controls, each displaying the pro rata share for the area(s) selected by the auditor as corresponding with a co-marketer type of the co-marketed document. For example, as shown in the example user interface 200 in FIG. 16, the audit viewer 1604 includes the label "Lender's Share" 1618, which displays the pro rata share for the areas selected by the auditor as corresponding to the lender co-marketer type, and the label "Agent's Share" 1620, which displays the pro rata share for the areas selected by the auditor as corresponding to the agent co-marketer type. In an embodiment, rather than having a "Calculate" button to calculate the pro rata shares of the areas selected by the auditor, the labels are updated dynamically as the auditor selects/deselects areas. By comparing the values in labels 1618, 1620 to the pro rata share values displayed within labels 212, 214, the auditor may determine by how much, if at all, the co-marketed document violates RESPA Section 8.

FIG. 17 is a block diagram illustrating various components of a document system 1710, according to an embodiment. As shown in FIG. 17, the document system 1710 is generally based on a three-tiered architecture, consisting of a front-end layer, application logic layer, and data layer. As is understood by skilled artisans in the relevant computer and Internet-related arts, each module or engine shown in FIG. 17 represents a hardware implementation (e.g., memory and processor) for executing the instructions. To avoid obscuring the disclosure with unnecessary detail, various functional modules and engines that are not germane to conveying an understanding of the disclosed subject matter have been omitted from FIG. 17. However, a skilled artisan will readily recognize that various additional functional modules and engines may be used with a document system 1710 such as that illustrated in FIG. 17, to facilitate additional functionality that is not specifically described herein. Furthermore, in an embodiment, the various functional modules and engines depicted in FIG. 17 reside on a single server computer; in another embodiment, the various functional modules and engines depicted in FIG. 17 are distributed across several server computers in various arrangements.

As shown in FIG. 17, the front end consists of a user interface module (e.g., a web server) 1712, which receives requests from various client computing devices (not shown), and communicates appropriate responses to the requesting client computing devices. In an embodiment, the user interface module(s) 1712 receive requests in the form of Hypertext Transport Protocol (HTTP) requests, or other web-based, application programming interface (API) requests. The application logic layer includes various application server modules 1714, which, in conjunction with the user interface module(s) 1712, generates various user interfaces (e.g., web pages) with data retrieved from various data sources in the data layer. In an embodiment, individual application server modules 1714 are used to implement the functionality associated with various services and features of the document system 1710. Similarly, other applications or services that utilize the co-marketing document module 1716 will be embodied in their own application server modules 1714.

As shown in FIG. 17, the data layer includes several databases, such as a database 1718 for storing profile data (e.g., user profile data), database 1720 for storing document and mark-up data, and database 1722 for print job data. In an embodiment, one or more of the data in databases 1718, 1720, and 1720 are combined into one database.

A user may utilize the co-marketer system for creating or modifying a co-marketed document. As previously noted, a user may be the co-marketer, such as the lender or the realtor, or may be an associate of the co-marketer, such as an administrative assistant or hired graphic designer, that the co-marketer has authorized to use the co-marketer system on the co-marketer's behalf. The co-marketer system may be used to create or modify a co-marketed document template for use in creating future co-marketed documents. A mark-up editor may be used with a co-marketed document template such that future co-marketed documents created with the co-marketed document template will have a known space allocation percentage for each co-marketer type.

While two or more co-marketers may have agreed to create a co-marketed document together, the co-marketers may not wish to allow the other co-marketer to edit any portion of the co-marketed document that does not belong to that particular co-marketer. For example, a lender and a realtor may agree to produce a co-marketed document together. However, the lender may wish to ensure that certain legal disclaimers appears on any document the lender produces. Thus, the lender not only wants to be able to edit portions of the co-marketed document, but the lender also does not want to allow the realtor to edit any portions belonging to the realtor to prevent the realtor from altering legally required language, such as the legal disclaimers.

A first user may access the co-marketer system by entering their credentials, such as a username and password. The co-marketer system may be a software program or application executed on a personal computing device or an online service accessed through a web browser. The co-marketer system may be accessed through various electronic devices such as a personal computer, a tablet, or a smartphone. Based on the first user entered credentials, the system may identify a first co-marketer type for the first user, such as realtor. In another example, a co-marketer type may identify a specific group, such as the Johnson Realty of Springfield.

The first user may instruct the co-marketer system to load an instance of a co-marketed document layout, such as a co-marketed document template. A co-marketed document layout may be configured with a set of editable regions. The editable regions may correspond to either the first co-marketer type or the second co-marketer type. A co-marketed document layout is not limited to two co-marketers and may be configured for more than two co-marketers. For example, a co-marketer document layout may include a third co-marketer type, such as a title closer.

The co-marketed document layout includes editable regions corresponding to a co-marketer type. For example, the co-marketed document layout includes editable regions with a portion of the regions designated as editable regions for the first co-marketer type and a portion of the regions designated as editable regions for the second co-marketer type. The co-marketed document layout may include editable regions for either co-marketer type. The co-marketer system, with the first user being identified as the first co-marketer type, may identify a first subset of the set of editable regions as associated with the first co-marketer type. The first subset having at least one editable region not included in a second subset of the set of editable regions.

The co-marketer system may provide a first graphical user interface (GUI) to the first user. The first GUI includes one or more GUI controls for the first user to edit each of the first subset of editable regions. The GUI controls include, but are not limited to, graphical editing tools such as inserting text, inserting an image, and the ability to change size, shape, color, and orientation. The co-marketer system may receive edits and modifications from the first GUI made by the first user. The first user may only edit regions in the first subset of editable regions and not edit regions in the second subset of editable regions. The co-marketer system may store the edits received from the second GUI that were made by the first user.

A user of the co-marketer system may make edits, through a GUI, to the portions of a co-marketed document layout designated as corresponding with the same co-marketer type as the user. The edits may include adding text and graphics. For example, if the co-marketer type for the user is a realtor, the user may add pictures of a home for sale and text detailing the attributes of the home. The user may also include contact information for the realtor and a picture of the realtor. The co-marketer system may recognize the user based on the user's credentials and automatically pre-populate fields in a co-marketed document template with information about the user or co-marketer type, such as a picture or contact information for the realtor. The co-marketer may also be associated with a larger group, such as a group of realtors, and the co-marketer system may automatically populate a logo, font, or color scheme, for example, associated with the realty group.

The co-marketer system may be connected, either directly to a device or by a network, to a database of graphics and information for populating the co-marketing document. For example, the database may be a user's storage device containing data and pictures the user wishes to utilize on the co-marketed document. For example, the database may also be a service such as the Multiple Listing Service (MLS) for realtors. Utilizing the identification of the user or the co-marketer type, the co-marketing system may access the MLS and locate all the home listings associated with the user. The user may select a listing from the set of listings associated with the user. By selecting a listing, the co-marketer system may load all the images and data associated with the listing. Some or all of the images and data may then populate into the co-marketed document template. The user may then select the data and images the user wishes to use for the co-marketed document in the subset of editable regions that the user may edit. After selecting the data and images the user wishes to use, the user may also edit and modify the data and images. For example, this may include revising the text and changing the color, size, or font of the text. This may include altering the size, orientation, and location of the images, as well as performing photo adjustments such as using photo color filters.

The co-marketer system may also automatically populate sections based on the co-marketer type. For example, if the co-marketer is determined to be a lender, the co-marketer system recognizes that a lender is required to provide legal disclaimers with any distributed documents. The co-marketer system thus automatically populates a section of the co-marketed document with required information such as legal disclaimers determined by the co-marketer type. The co-marketer system may also present the user with multiple options of required information based on the co-marketer type. For example, the co-marketer may have different legal disclaimers corresponding to the type of co-marketing document being created. The co-marketer may then select the appropriate legal disclaimer for the co-marketed document being created.

A second user may access the co-marketer system by entering their credentials, such as a username and password. The second user may access the co-marketing system from their own device, separate from the first user's device. Based on the second user entered credentials, the system may identify a second co-marketer type for the second user, such as being a lender. The co-marketer system, with the second user being identified as the second co-marketer type, may identify a second subset of the set of editable regions as associated with the second co-marketer type. The second subset having at least one editable region not included in the first subset of the set of editable regions.

The co-marketer system may provide a second GUI to the second user. The second. GUI includes one or more GUI controls, similar to the first GUI, for the second user to edit each of the second subset of editable regions. The co-marketer system may receive edits and modifications from the second GUI made by the second user. The second user may only edit regions in the second subset of editable regions and not edit regions in the first subset of editable regions. The co-marketer system may store the edits received from the second GUI that were made by the second user.

The co-marketer system may display in a GUI the modified co-marketed document with the edits made by each user of a co-marketer. The area mark-up process may be performed on the modified co-marketed document both during the editing process and once the co-marketed document is completed. A user may wish to perform the area mark-up process during the editing of the co-marketed document if there is a predetermined area allocation desired. For example, two co-marketers, a realtor and a lender, agree they wish to create a co-marketed document with the realtor having 75% allocated space and the lender having 25% allocated space. The users of the co-marketer system may wish to utilize the mark-up process during the editing of the co-marketed document to ensure the edit and modifications stay within the desired space allocations.

The co-marketed document may be edited and modified multiple times by users of each co-marketer type, with the edits to the co-marketed document being stored when each user completes their edits. In an embodiment, when a user of a first co-marketer type completes and stores their work, the co-marketer system may notify the second co-marketer type. A notification may be initiated by a user or automatically sent when work is completed for a co-marketer type. Notifications may be a transmitted notification such as an email, instant message, or SMS text message. A notification may also be within the co-marketer system such as an alert or message provided the next time a user for the second co-marketer type logs into the co-marketer system.

The co-marketer system may limit a user of a co-marketer type from editing regions of the co-marketed document that are not designated as regions for the same co-marketer type. The co-marketed document may also have joint editable regions that may allow multiple co-marketer types to edit the region. In an embodiment, the co-marketed document layout may have editable regions designated only editable by one of the co-marketer types, but may allow movement of the placement for the editable regions by any co-marketer type. For example, a co-marketed document layout may contain a first set of editable regions for a first co-marketer type and a second set of editable regions for a second co-marketer type. As previously described, the a user of the first co-marketer type may only edit the content of the first set of editable regions and a user of the second co-marketer type may only edit content of the second set of editable regions. However, in this embodiment, the placement of the first and second set of editable regions may be modified by either co-marketer type. This embodiment may allow the co-marketers to ensure the content within their designated editable regions of the co-marketed document was correct, but may allow either co-marketer to determine the placement of the content for the presentation and aesthetic of the co-marketed document.

Figure 18:
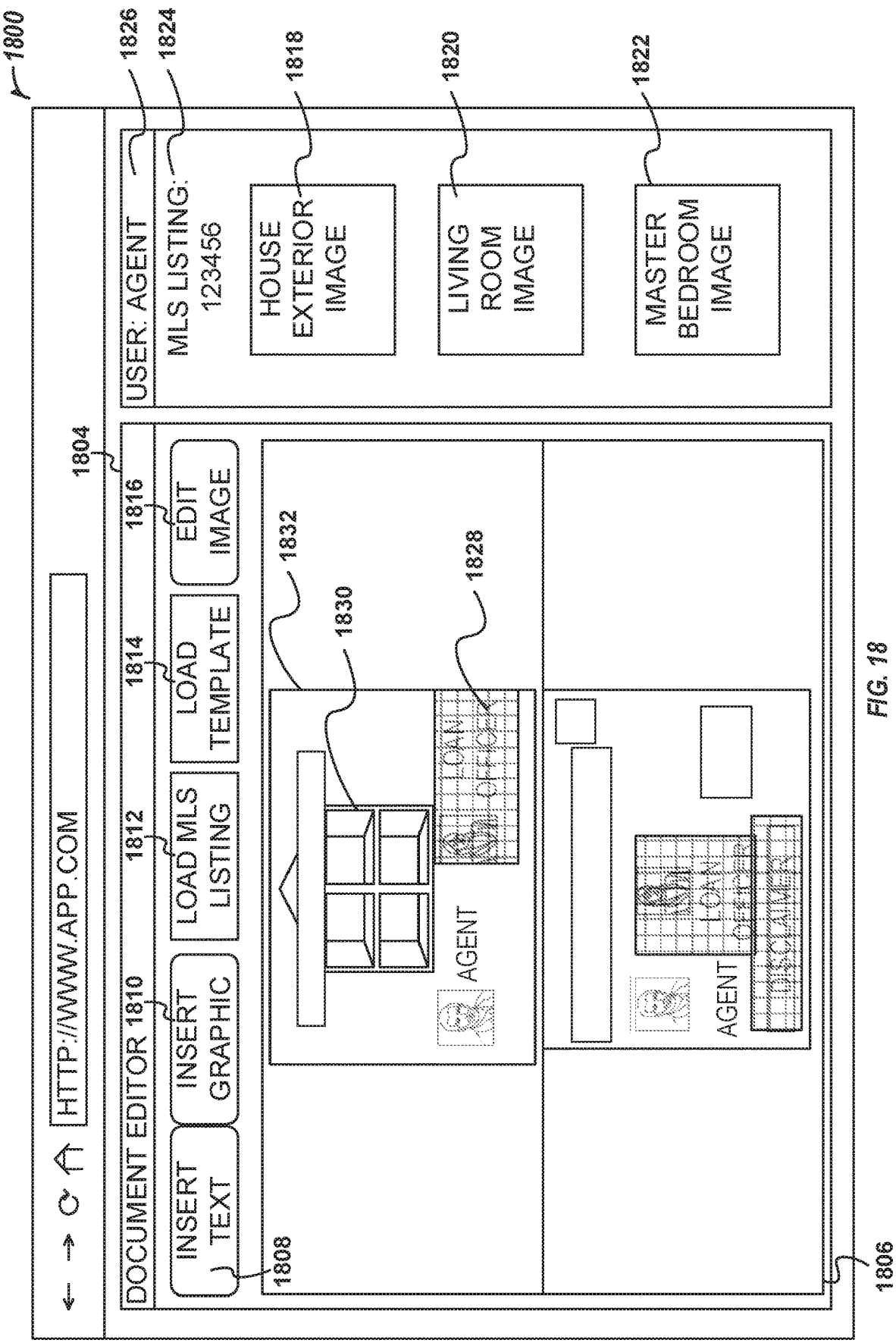
FIG. 18 illustrates an example user interface including a document editor for editing a document corresponding to a plurality of co-marketers, according to an embodiment.

FIG. 18 illustrates an example user interface 1800 including a document editor 1804 for editing a document corresponding to a plurality of co-marketers, according to an embodiment. As illustrated in FIG. 18, the user interface 1800 is displayed within a web page; however, the user interface 1800 may alternatively be displayed by a separate program executing on a client computer.

The markup editor 1804 includes a document area 1806, where a co-marketed document is displayed. A user may use the document area 1806 of document editor 1804 to edit a region of the co-marketed document 1832.

The document editor 1804 includes GUI controls for a user to edit a co-marketed document 1832. The document editor 1804 includes GUI controls such as an "Insert Text" button 1808 to activate the functionality of inserting a text block in the co-marketed document 1832 or an "Insert Graphic" button 1810 to activate the functionality of inserting a graphic image in the co-marketed document 1832. The GUI controls include a "Load MLS Listing" button 1812, which when clicked by a user may prompt the user for an MLS listing number the user wishes to load information for. In an embodiment, by clicking the "Load MLS Listing" button 1812, the co-marketer system may recognize the identity of the user and automatically provide a list of all the MLS listings associated with the user. The GUI controls may include a "Load Template" button 1814 for loading a co-marketing document template. The GUI controls may include an "Edit Image" button 1816 for a user to adjust aspects (e.g., color, size, orientation) of an image, such as the house image 1830.

In the example user interface 1800, the current user is Agent, as indicated in the user identification 1826. In the example, based on the identification of the user as Agent, the regions of the co-marketed document 1832 that belong to Lender are not accessible by Agent. The cross-hatch area 1828 indicates the current user, Agent, may not edit this portion of the co-marketed document 1832.

In the example illustration 1800, the user has loaded an MLS listing 1824. The loaded MLS listing 1824 provides images for the user to utilize on the co-marketed document, such as a house exterior image 1818, a living room image, 1820, and a master bedroom image 1822.

Figure 19:
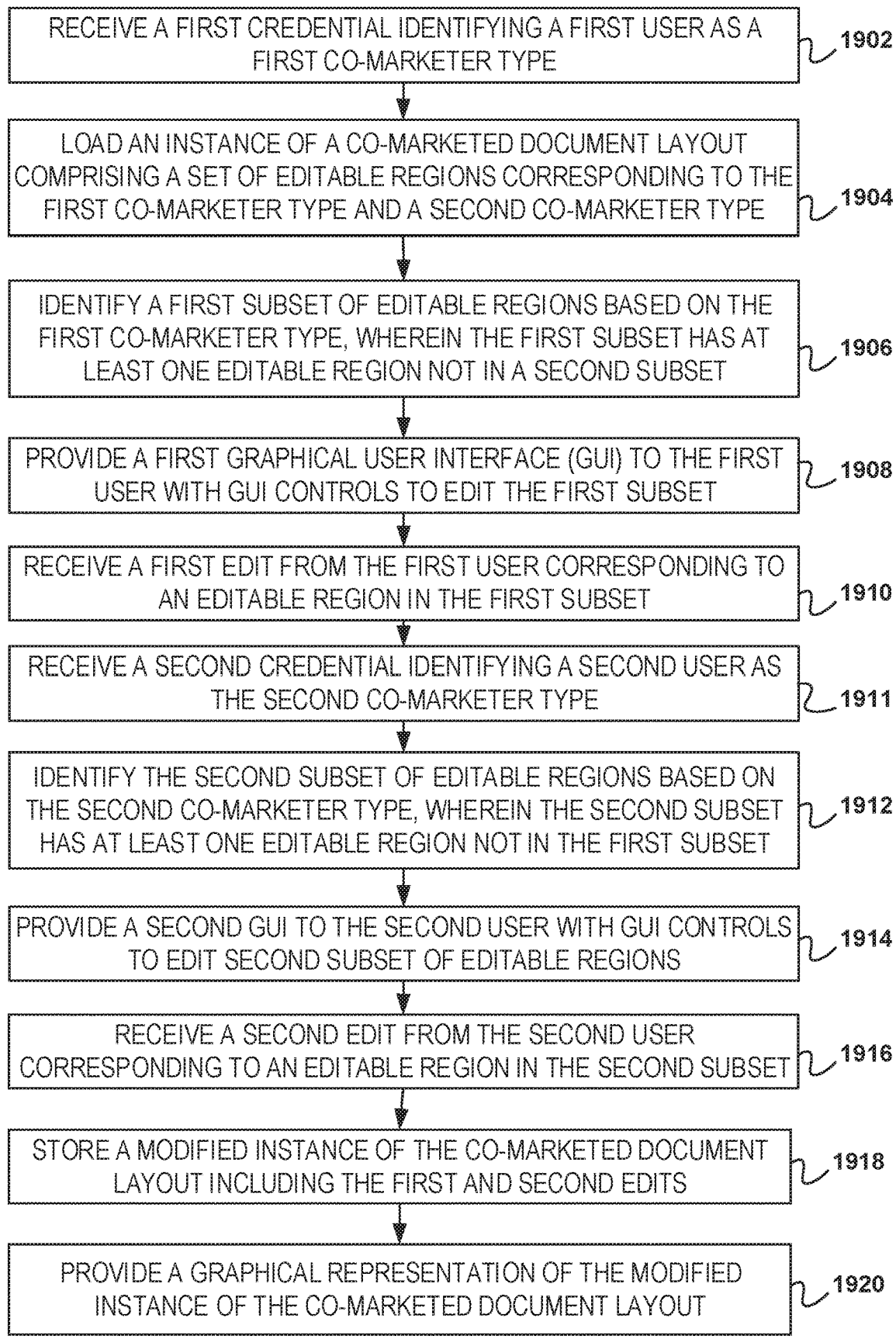
FIG. 19 is a flow diagram illustrating a method for editing a co-marketed document, according to an embodiment.

FIG. 19 is a flow diagram illustrating a method for editing a co-marketed document, according to an embodiment. The co-marketer system may receive a first credential identifying a first user as a first co-marketer type (operation 1902). For example, a credential may be a username and password, a biometric, or scan of an access card. The co-marketer system may then load an instance of a co-marketed document layout corresponding to the first co-marketer type and a second co-marketer type, the instance comprising a set of editable regions (operation 1904). The co-marketer system may then identify a first subset of the set of editable regions based on identifying the first user as the first co-marketer type, wherein the first subset has at least one editable region not included in a second subset of the set of editable regions (operation 1906). For example, the co-marketed document layout has editable regions that are designated for one or the other co-marketer type. Thus, there may be regions designated for the first co-marketed type which are not designated for the second co-marketer type.

The co-marketer system may provide a first graphical user interface (GUI) to the first user, the GUI providing one or more GUI controls to edit the first subset of editable regions (operation 1908). The GUI provides mechanisms for a user to edit and modify the editable regions of the co-marketed document, as seen in the example illustration FIG. 18. The co-marketer system may receive a first edit from the first user corresponding to at least one editable region in the first subset of the set of editable regions (operation 1910). An edit may comprise adding text, inserting a graphic, moving the placement of the editable regions, or loading information from a database, such as an MLS database.

The co-marketer system may receive a second credential identifying a second user as the second co-marketer type (operation 1911). The second co-marketer type being different from the first co-marketer type to distinguish two separate entities for the co-marketed document. The co-marketer system may identify the second subset of the set of editable regions based on identifying the second user as the second co-marketer type, wherein the second subset has at least one editable region not included in the first subset of the set of editable regions (operation 1912). The co-marketer system may provide a second GUI to the second user, the second GUI providing one or more GUI controls to edit the second subset of editable regions (operation 1914) and receive a second edit from the second user corresponding to at least one editable region in the second subset of the set of editable regions (operation 1916).

The co-marketer system, having received the first and second edits may then store a modified instance of the co-marketed document layout including the first and second edits (operation 1918). The co-marketer system may then provide a graphical representation of the modified instance of the co-marketed document layout (operation 1920).

The above detailed description includes descriptions and examples of a co-marketer system utilized by two co-marketers for the creation, modification, and mark-up of a co-marketed document. The co-marketed system may be utilized by more than two co-marketers to create, modify, and mark-up a co-marketed document. For example, the co-marketer system may allow a realtor, lender, title closer, and builder to be co-marketers together and create a co-marketed document together.

The co-marketer system may be connected to a printing service by a network. The co-marketer system may receive information from the printing service about the types of services and costs of those services offered by the printing service. The co-marketer system may use the information provided by the printing service to present printing options to the co-marketer system users and determine the cost of printing a co-marketed document including the cost for each co-marketer based on the determined percentages from the mark-up process.

The co-marketer system may also receive payments from co-marketers for the printing of co-marketed documents by a printing service. Because of regulations concerning incentives, such as those discussed with RESPA, once a print product has been selected and the percentage of space allocation for each co-marketer determined, the co-marketer system may be used to collect payment from each of the co-marketers. This may help ensure there is no overpayment by a co-marketer has occurred and thus give the other a "thing of value."

Figure 20:
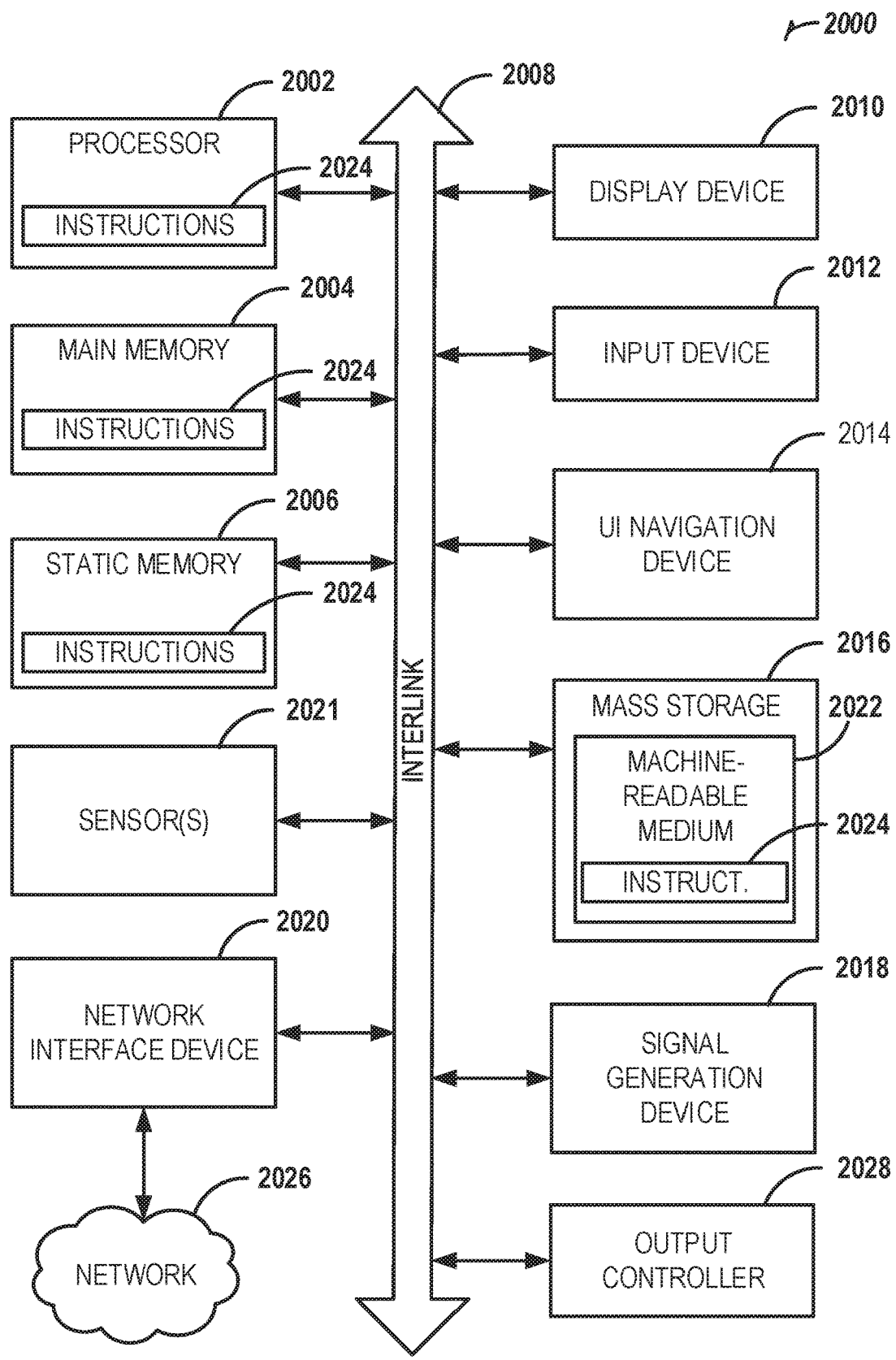
FIG. 20 is a block diagram illustrating an example of a machine, upon which any one or more example embodiments may be implemented.

FIG. 20 is a block diagram illustrating an example of a machine 2000, upon which any one or more example embodiments may be implemented. In alternative embodiments, the machine 2000 may operate as a standalone device or may be connected (e.g., networked) to other machines. In a networked deployment, the machine 2000 may operate in the capacity of a server machine, a client machine, or both in a client-server network environment. In an example, the machine 2000 may act as a peer machine in a peer-to-peer (P2P) (or other distributed) network environment. The machine 2000 may implement or include any portion of the advertising system of FIG. 17, and may be a personal computer (PC), a tablet PC, a set-top box (STB), a personal digital assistant (PDA), a mobile telephone, a smart phone, a web appliance, a network router, switch or bridge, or any machine capable of executing instructions (sequential or otherwise) that specify actions to be taken by that machine. Further, although only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations, etc.

Examples, as described herein, may include, or may operate by, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine-readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Machine (e.g., computer system) 2000 may include a hardware processor 2002 (e.g., a central processing unit (CPU), a graphics processing unit (GPU), a hardware processor core, or any combination thereof), a main memory 2004 and a static memory 2006, some or all of which may communicate with each other via an interlink (e.g., bus) 2008. The machine 2000 may further include a display unit 2010, an alphanumeric input device 2012 (e.g., a keyboard), and a user interface (UI) navigation device 2014 (e.g., a mouse). In an example, the display unit 2010, input device 2012 and UI navigation device 2014 may be a touch screen display. The machine 2000 may additionally include a storage device (e.g., drive unit) 2016, a signal generation device 2018 (e.g., a speaker), a network interface device 2020, and one or more sensors 2021, such as a global positioning system (GPS) sensor, compass, accelerometer, or other sensor. The machine 2000 may include an output controller 2028, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.)

The storage device 2016 may include a machine-readable medium 2022 on which is stored one or more sets of data structures or instructions 2024 (e.g., software) embodying or utilized by any one or more of the techniques or functions described herein. The instructions 2024 may also reside, completely or at least partially, within the main memory 2004, within static memory 2006, or within the hardware processor 2002 during execution thereof by the machine 2000. In an example, one or any combination of the hardware processor 2002, the main memory 2004, the static memory 2006, or the storage device 2016 may constitute machine-readable media.

Although the machine-readable medium 2022 is illustrated as a single medium, the term "machine-readable medium" may include a single medium or multiple media (e.g., a centralized or distributed database, and/or associated caches and servers) configured to store the one or more instructions 2024.

The term "machine-readable medium" may include any medium that is capable of storing, encoding, or carrying instructions for execution by the machine 2000 and that cause the machine 2000 to perform any one or more of the techniques of the present disclosure, or that is capable of storing, encoding or carrying data structures used by or associated with such instructions. Non-limiting machine-readable medium examples may include solid-state memories, and optical and magnetic media. Accordingly, machine-readable media are not transitory propagating signals. Specific examples of machine-readable media may include non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); Solid State Drives (SSD); and CD-ROM and DVD-ROM disks.

The instructions 2024 may further be transmitted or received over a communications network 2026 using a transmission medium via the network interface device 2020 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as IEEE 802.16 family of standards known as WiMAX®), IEEE 802.15.4 family of standards, a Long Term Evolution (LTE) family of standards, a Universal Mobile Telecommunications System (UMTS) family of standards, peer-to-peer (P2P) networks, among others. In an example, the network interface device 2020 may include one or more physical jacks (e.g., Ethernet, coaxial, or phone jacks) or one or more antennas to connect to the communications network 2026. In an example, the network interface device 2020 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 2000, and includes digital or analog communications signals or other intangible medium to facilitate communication of such software.

Conventional terms in the fields of computer networking and computer systems have been used herein. The terms are known in the art and are provided only as a non-limiting example for convenience purposes. Accordingly, the interpretation of the corresponding terms in the claims, unless stated otherwise, is not limited to any particular definition.

Although specific embodiments have been illustrated and described herein, it will be appreciated by those of ordinary skill in the art that any arrangement that is calculated to achieve the same purpose may be substituted for the specific embodiments shown. Many adaptations will be apparent to those of ordinary skill in the art. Accordingly, this application is intended to cover any adaptations or variations.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. Moreover, in the following claims, the terms "first," "second," and "third," etc. are used merely as labels, and are not intended to impose numerical requirements on their objects.

In this Detailed Description, various features may have been grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment, and it is contemplated that such embodiments may be combined with each other in various combinations or permutations. The scope of the embodiments should be determined with reference to the appended claims, along with the full scope of equivalents to which such claims are entitled.

The above description is intended to be illustrative, and not restrictive. For example, the above-described examples (or one or more aspects thereof) may be used in combination with each other. Other embodiments may be used, such as by one of ordinary skill in the art upon reviewing the above description. The Abstract is provided to allow the reader to quickly ascertain the nature of the technical disclosure and is submitted with the understanding that it will not be used to interpret or limit the scope or meaning of the claims.

Example 1 is a non-transitory machine-readable medium, comprising instructions which when executed by a machine, cause the machine to: receive a first credential identifying a first user as a first co-marketer type; load an instance of a co-marketed document layout corresponding to the first co-marketer type and a second co-marketer type, the instance comprising a set of editable regions; identify a first subset of the set of editable regions based on identifying the first user as the first co-marketer type, wherein the first subset has at least one editable region not included in a second subset of the set of editable regions; provide a first graphical user interface (GUI) to the first user, the GUI providing one or more GUI controls to edit the first subset of editable regions; receive a first edit from the first user corresponding to at least one editable region in the first subset of the set of editable regions; receive a second credential identifying a second user as the second co-marketer type; identify the second subset of the set of editable regions based on identifying the second user as the second co-marketer type, wherein the second subset has at least one editable region not included in the first subset of the set of editable regions; provide a second GUI to the second user, the second GUI providing one or more GUI controls to edit the second subset of editable regions; receive a second edit from the second user corresponding to at least one editable region in the second subset of the set of editable regions; store a modified instance of the co-marketed document layout including the first and second edits; and provide a graphical representation of the modified instance of the co-marketed document layout.

In Example 2, the subject matter of Example 1 includes, wherein the set of editable regions of the instance includes one or more editable text or graphic.

In Example 3, the subject matter of Example 2 includes, wherein the editable graphic comprises an image received from a listing associated with the first or second co-marketer on the Multiple Listing Service (MLS).

In Example 4, the subject matter of Examples 2-3 includes, wherein the editable text comprises textual data received from a listing associated with the first or second co-marketer on the Multiple Listing Service (MLS).

In Example 5, the subject matter of Examples 1-4 includes, instructions to: provide a third GUI to the first or second user, the third GUI providing one or more GUI controls to select at least one area of the modified instance of the co-marketed document layout and assign a selected area to either the first co-marketer type or the second co-marketer type; receive a first selection area designated by a first set of coordinates corresponding to at least one selected area of the modified instance of the co-marketed document layout, wherein the first selection area is associated with the first co-marketer type; receive a second selection area designated by a second set of coordinates corresponding to at least one selected area of the modified instance of the co-marketed document layout, wherein the second selection area is associated with the second co-marketer type; calculate a selected area total comprising a sum of the first selection area and the second selection area; calculate a first percentage for the first selection area of the selected area total and a second percentage for the second selection area of the selected area total; and provide, to the third GUI, the first percentage and the second percentage for display.

In Example 6, the subject matter of Example 5 includes, instructions to: receive the first set of coordinates as the first or second user is creating the first selection area; and provide, to the third GUI, the first percentage and the second percentage for display as the first or second user is creating the first selection area.

In Example 7, the subject matter of Examples 5-6 includes, instructions to: receive the second set of coordinates as the first or second user is creating the second selection area; and provide, to the third GUI, the first percentage and the second percentage for display as the first or second user is creating the second selection area.

In Example 8, the subject matter of Examples 1-7 includes, instructions to transmit the modified instance to a network-based printing service for printing physical copies of the modified instance of the co-marketed document layout.

In Example 9, the subject matter of Examples 1-8 includes, instructions to transmit the modified instance to a printer for printing physical copies of the modified instance of the co-marketed document layout.

In Example 10, the subject matter of Examples 1-9 includes, wherein the instance of a co-marketed document layout is based on a co-marketed document layout template.

In Example 11, the subject matter of Examples 1-10 includes, where the second user cannot edit the first subset of the set of editable regions.

In Example 12, the subject matter of Examples 1-11 includes, wherein the first user cannot edit the second subset of the set of editable regions.

In Example 13, the subject matter of Examples 1-12 includes, wherein the first user and the second user are using different devices.

Example 14 is a method comprising: receiving a first credential identifying a first user as a first co-marketer type; loading an instance of a co-marketed document layout corresponding to the first co-marketer type and a second co-marketer type, the instance comprising a set of editable regions; identifying a first subset of the set of editable regions based on identifying the first user as the first co-marketer type, wherein the first subset has at least one editable region not included in a second subset of the set of editable regions; providing a first graphical user interface (GUI) to the first user, the GUI providing one or more GUI controls to edit the first subset of editable regions; receiving a first edit from the first user corresponding to at least one editable region in the first subset of the set of editable regions; receiving a second credential identifying a second user as the second co-marketer type; identifying the second subset of the set of editable regions based on identifying the second user as the second co-marketer type, wherein the second subset has at least one editable region not included in the first subset of the set of editable regions; providing a second GUI to the second user, the second GUI providing one or more GUI controls to edit the second subset of editable regions; receiving a second edit from the second user corresponding to at least one editable region in the second subset of the set of editable regions; storing a modified instance of the co-marketed document layout including the first and second edits; and providing a graphical representation of the modified instance of the co-marketed document layout.

In Example 15, the subject matter of Example 14 includes, wherein the set of editable regions of the instance includes one or more editable text or graphic.

In Example 16, the subject matter of Example 15 includes, wherein the editable graphic comprises an image received from a listing associated with the first or second co-marketer on the Multiple Listing Service (MLS).

In Example 17, the subject matter of Examples 15-16 includes, wherein the editable text comprises textual data received from a listing associated with the first or second co-marketer on the Multiple Listing Service (MLS).

In Example 18, the subject matter of Examples 14-17 includes, providing a third GUI to the first or second user, the third GUI providing one or more GUI controls to select at least one area of the modified instance of the co-marketed document layout and assign a selected area to either the first co-marketer type or the second co-marketer type; receiving a first selection area designated by a first set of coordinates corresponding to at least one selected area of the modified instance of the co-marketed document layout, wherein the first selection area is associated with the first co-marketer type; receiving a second selection area designated by a second set of coordinates corresponding to at least one selected area of the modified instance of the co-marketed document layout, wherein the second selection area is associated with the second co-marketer type; calculating a selected area total comprising a sum of the first selection area and the second selection area; calculating a first percentage for the first selection area of the selected area total and a second percentage for the second selection area of the selected area total; and providing, to the third GUI, the first percentage and the second percentage for display.

In Example 19, the subject matter of Example 18 includes, receiving the first set of coordinates as the first or second user is creating the first selection area; and providing, to the third GUI, the first percentage and the second percentage for display as the first or second user is creating the first selection area.

In Example 20, the subject matter of Examples 18-19 includes, receiving the second set of coordinates as the first or second user is creating the second selection area; and providing, to the third GUI, the first percentage and the second percentage for display as the first or second user is creating the second selection area.

Example 21 is a system comprising: a processor and memory, including instructions which when executed by the processor, cause the processor to: receive a first credential identifying a first user as a first co-marketer type; load an instance of a co-marketed document layout corresponding to the first co-marketer type and a second co-marketer type, the instance comprising a set of editable regions; identify a first subset of the set of editable regions based on identifying the first user as the first co-marketer type, wherein the first subset has at least one editable region not included in a second subset of the set of editable regions; provide a first graphical user interface (GUI) to the first user, the GUI providing one or more GUI controls to edit the first subset of editable regions; receive a first edit from the first user corresponding to at least one editable region in the first subset of the set of editable regions; receive a second credential identifying a second user as the second co-marketer type; identify the second subset of the set of editable regions based on identifying the second user as the second co-marketer type, wherein the second subset has at least one editable region not included in the first subset of the set of editable regions; provide a second GUI to the second user, the second GUI providing one or more GUI controls to edit the second subset of editable regions; receive a second edit from the second user corresponding to at least one editable region in the second subset of the set of editable regions; store a modified instance of the co-marketed document layout including the first and second edits; and provide a graphical representation of the modified instance of the co-marketed document layout.

In Example 22, the subject matter of Example 21 includes, wherein the set of editable regions of the instance includes one or more editable text or graphic.

In Example 23, the subject matter of Example 22 includes, wherein the editable graphic comprises an image received from a listing associated with the first or second co-marketer on the Multiple Listing Service (MLS).

In Example 24, the subject matter of Examples 22-23 includes, wherein the editable text comprises textual data received from a listing associated with the first or second co-marketer on the Multiple Listing Service (MLS).

In Example 25, the subject matter of Examples 21-24 includes, wherein the instruction further cause the processor to: provide a third GUI to the first or second user, the third GUI providing one or more GUI controls to select at least one area of the modified instance of the co-marketed document layout and assign a selected area to either the first co-marketer type or the second co-marketer type; receive a first selection area designated by a first set of coordinates corresponding to at least one selected area of the modified instance of the co-marketed document layout, wherein the first selection area is associated with the first co-marketer type; receive a second selection area designated by a second set of coordinates corresponding to at least one selected area of the modified instance of the co-marketed document layout, wherein the second selection area is associated with the second co-marketer type; calculate a selected area total comprising a sum of the first selection area and the second selection area; calculate a first percentage for the first selection area of the selected area total and a second percentage for the second selection area of the selected area total; and provide, to the third GUI, the first percentage and the second percentage for display.

In Example 26, the subject matter of Example 25 includes, wherein the instruction further cause the processor to: receive the first set of coordinates as the first or second user is creating the first selection area; and provide, to the third GUI, the first percentage and the second percentage for display as the first or second user is creating the first selection area.

Example 27 is at least one machine-readable medium including instructions that, when executed by processing circuitry, cause the processing circuitry to perform operations to implement of any of Examples 1-26.

Example 28 is an apparatus comprising means to implement of any of Examples 1-26.

Example 29 is a system to implement of any of Examples 1-26.

Example 30 is a method to implement of any of Examples 1-26.

What is claimed is:

1. A non-transitory machine-readable medium, comprising instructions which when executed by a machine, cause the machine to:
   receive an identification for a template of a co-marketed document layout;
   load the template, wherein the template includes a plurality of regions associated with at least a first co-marketer type and a plurality of regions associated with at least a second co-marketer type;
   receive a credential for a user, wherein the credential identifies the user as the first co-marketer type;
   receive an identification associated with an identified data set from a plurality of data sets;
   populate the plurality of regions of the template associated with at least the first co-marketer type with data items from the identified data set;
   store the template with populated regions as a co-marketed document;
   determine an amount of space of the co-marketed document populated with data items of the first co-marketer type;
   calculate a percentage of total space of the co-marketed document populated with data items of the first co-marketer type; and
   transmit a message to a device associated with a second co-marketer user indicating the percentage of total space of the co-marketed document populated with data items of the first co-marketer type.

2. The non-transitory machine-readable medium of claim 1, further comprising instructions to:
   receive a credential for a second user, wherein the credential for the second user identifies the second user as the second co-marketer type;
   receive a second identification associated with a second data set from the plurality of data sets;
   populate the plurality of regions of the template associated with at least the second co-marketer type with data items from the second data set; and
   store the template with populated regions as the co-marketed document.

3. The non-transitory machine-readable medium of claim 1, further comprising instructions to:
   transmit an electronic communication to the device associated with the second co-marketer type, wherein the electronic communication is a notification of storing the co-marketed document.

4. The non-transitory machine-readable medium of claim 1, wherein at least one of the plurality of regions associated with at least the first co-marketer type is locked from editing by the second co-marketer type.

5. The non-transitory machine-readable medium of claim 4, wherein the second co-marketer type may alter placement within the co-marketed document of the at least one of the plurality of regions associated with at least the first co-marketer type.

6. The non-transitory machine-readable medium of claim 1, further comprising instructions to:
   automatically populate a region of the template with a data item from the data set, wherein the region is designated for a membership of the first co-marketer type and wherein the data item is representation for the membership of the first co-marketer type.

7. The non-transitory machine-readable medium of claim 1, wherein at least one of the plurality of regions associated with at least the first co-marketer type is designated for a legal disclaimer.

8. A system comprising:
   at least one processor; and memory including instructions that, when executed by the at least one processor, cause the at least one processor to:
- receive an identification for a template of a co-marketed document layout;
- load the template, wherein the template includes a plurality of regions associated with at least a first co-marketer type and a plurality of regions associated with at least a second co-marketer type;
- receive a credential for a user, wherein the credential identifies the user as the first co-marketer type;
- receive an identification associated with an identified data set from a plurality of data sets;
- populate the plurality of regions of the template associated with at least the first co-marketer type with data items from the identified data set;
- store the template with populated regions as a co-marketed document;
- determine an amount of space of the co-marketed document populated with data items of the first co-marketer type;
- calculate a percentage of total space of the co-marketed document populated with data items of the first co-marketer type; and
- transmit a message to a device associate with a second co-marketer user indicating the percentage of total space of the co-marketed document populated with data items of the first co-marketer type.

9. The system of claim 8, further comprising instructions to:
- receive a credential for a second user, wherein the credential for the second user identifies the second user as the second co-marketer type;
- receive a second identification associated with a second data set from a plurality of data sets;
- populate regions of the template associated with at least the second co-marketer type with data items from the second data set; and
- store the template with populated regions as the co-marketed document.

10. The system of claim 8, further comprising instructions to:
- transmit an electronic communication to the device associated with the second co-marketer type, wherein the electronic communication is a notification of storing the co-marketed document.

11. The system of claim 8, wherein at least one of the plurality of regions associated with at least the first co-marketer type is locked from editing by the second co-marketer type.

12. The system of claim 11, wherein the second co-marketer type may alter placement within the co-marketed document of the at least one of the plurality of regions associated with at least the first co-marketer type.

13. The system of churn 8, further comprising instructions to:
- automatically populate a region of the template with a data item from the data set, wherein the region is designated for a membership of the first co-marketer type and wherein the data item is representation for the membership of the first co-marketer type.

14. The system of claim 8, wherein at least one of the plurality of regions associated with at least the first co-marketer type is designated for a legal disclaimer.

15. A method comprising:
- receiving an identification for a template of a co-marketed document layout;
- loading the template, wherein the template includes a plurality of regions associated with at least a first co-marketer type and a plurality of regions associated with at least a second co-marketer type;
- receiving a credential for a user, wherein the credential identifies the user as the first co-marketer type;
- receiving an identification associated with an identified data set from a plurality of data sets;
- populating the plurality of regions of the template associated with at least the first co-marketer type with data items from the identified data set;
- storing the template with populated regions as a co-marketed document;
- determining an amount of space of the co-marketed document populated with data items of the first co-marketer type;
- calculating a percentage of total space of the co-marketed document populated with data items of the first co-marketer type; and
- transmitting a message to a device associated with a second co-marketer user indicating the percentage of total space of the co-marketed document populated with data items of the first co-marketer type.

16. The method of claim 15, further comprising instructions to:
- receiving a credential for a second user, wherein the credential for the second user identifies the second user as the second co-marketer type;
- receiving a second identification associated with a second data set from a plurality of data sets;
- populating the plurality of regions of the template associated with at least the second co-marketer type with data items from the second data set; and
- storing the template with populated regions as the co-marketed document.

17. The method of claim 15, further comprising instructions to:
- automatically populating a region of the template with a data item from the data set, wherein the region is designated for a membership of the first co-marketer type and wherein the data item is representation for the membership of the first co-marketer type.

* * * * *